United States Patent
Humpal et al.

(10) Patent No.: US 10,626,055 B2
(45) Date of Patent: Apr. 21, 2020

(54) METAL OXIDE PARTICLES

(71) Applicant: 3M INNOVATIVE PROPERTIES COMPANY, St. Paul, MN (US)

(72) Inventors: Kathleen M. Humpal, Stillwater, MN (US); Brant U. Kolb, Afton, MN (US); Margaret M. Vogel-Martin, Forest Lake, MN (US); Mark J. Hendrickson, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/914,459

(22) PCT Filed: Sep. 12, 2014

(86) PCT No.: PCT/US2014/055389
§ 371 (c)(1),
(2) Date: Feb. 25, 2016

(87) PCT Pub. No.: WO2015/038890
PCT Pub. Date: Mar. 19, 2015

(65) Prior Publication Data
US 2016/0214903 A1    Jul. 28, 2016

Related U.S. Application Data

(63) Continuation-in-part of application No. 14/025,958, filed on Sep. 13, 2013, now Pat. No. 9,878,954.
(Continued)

(51) Int. Cl.
*C04B 35/486* (2006.01)
*E06B 3/66* (2006.01)
(Continued)

(52) U.S. Cl.
CPC .......... *C04B 35/486* (2013.01); *E06B 3/6612* (2013.01); *E06B 3/66304* (2013.01);
(Continued)

(58) Field of Classification Search
CPC .... C04B 2235/3217; C04B 2235/3225; C04B 2235/3227; C04B 35/00; C04B 35/486;
(Continued)

(56) References Cited

U.S. PATENT DOCUMENTS 4,690,910 A * 9/1987 Tsukuma .............. C04B 35/486
501/103
4,772,511 A 9/1988 Wood
(Continued)

FOREIGN PATENT DOCUMENTS

EP 0293163 11/1988
EP 2045222 4/2009
(Continued)

OTHER PUBLICATIONS

Adschiri, "Rapid and Continuous Hydrothermal Crystallization of Metal Oxide Particles in Supercritical Water", J. Am. Ceram. Soc., 1992, vol. 75, No. 4, pp. 1019-1022.
(Continued)

*Primary Examiner* — Shuangyi Abu Ali
(74) *Attorney, Agent, or Firm* — Jean A. Lown

(57) ABSTRACT

Metal oxide particles, such as molded particles, as well as methods of making and articles containing the same. The particles can contain at least 70 mol percent $ZrO_2$, and can be made by a molding process.

17 Claims, 5 Drawing Sheets

Related U.S. Application Data

(60) Provisional application No. 62/048,972, filed on Sep. 11, 2014.

(51) Int. Cl.
*E06B 3/663* (2006.01)
*C04B 35/00* (2006.01)

(52) U.S. Cl.
CPC ...... *C04B 35/00* (2013.01); *C04B 2235/3217* (2013.01); *C04B 2235/3225* (2013.01); *C04B 2235/3227* (2013.01); *Y02A 30/25* (2018.01); *Y02B 80/24* (2013.01); *Y10T 428/24479* (2015.01); *Y10T 428/24612* (2015.01); *Y10T 428/252* (2015.01)

(58) Field of Classification Search
CPC ... E06B 3/6612; E06B 3/66304; Y02A 30/25; Y02B 80/24; Y10T 428/24479; Y10T 428/24612; Y10T 428/252
See application file for complete search history.

(56) References Cited

U.S. PATENT DOCUMENTS

| | | | |
|---|---|---|---|
| 4,931,414 A | | 6/1990 | Wood |
| 5,017,532 A | * | 5/1991 | Sonnenberg .......... C04B 35/486 501/103 |
| 5,124,185 A | | 6/1992 | Kerr |
| 5,152,917 A | | 10/1992 | Pieper |
| 5,201,916 A | * | 4/1993 | Berg ................... B24D 3/14 264/6 |
| 5,435,816 A | | 7/1995 | Spurgeon |
| 5,453,262 A | | 9/1995 | Dawson |
| 5,652,192 A | | 7/1997 | Matson |
| 5,657,607 A | | 8/1997 | Collins |
| 5,672,097 A | | 9/1997 | Hoopman |
| 5,891,536 A | | 4/1999 | Collins |
| 5,902,652 A | | 5/1999 | Collins |
| 5,946,991 A | | 9/1999 | Hoopman |
| 5,975,987 A | | 11/1999 | Hoopman |
| 6,121,177 A | | 9/2000 | Guigonis |
| 6,129,540 A | | 10/2000 | Hoopman |
| 6,261,652 B1 | | 7/2001 | Poix |
| 6,326,067 B1 | | 12/2001 | Veerasamy |
| 6,352,749 B1 | | 3/2002 | Aggas |
| 6,372,312 B1 | | 4/2002 | Aggas |
| 6,387,460 B1 | | 5/2002 | Shukuri |
| 6,479,112 B1 | | 11/2002 | Shukuri |
| 6,497,931 B1 | | 12/2002 | Aggas |
| 6,946,171 B1 | | 9/2005 | Aggas |
| 7,241,437 B2 | | 7/2007 | Davidson |
| 7,429,422 B2 | | 9/2008 | Davidson |
| 7,556,558 B2 | * | 7/2009 | Palmgren .............. B24D 18/00 451/540 |
| 8,123,828 B2 | | 2/2012 | Culler |
| 8,679,599 B2 | | 3/2014 | Grzybowski |
| 8,853,112 B2 | * | 10/2014 | Nonnet ................... B02C 17/20 501/134 |
| 2007/0104663 A1 | * | 5/2007 | Henglein ............. C09C 1/0015 424/61 |
| 2008/0264106 A1 | | 10/2008 | Oswald |
| 2012/0088045 A1 | | 4/2012 | Veerasamy |
| 2012/0247063 A1 | | 10/2012 | Grzybowski |
| 2014/0021492 A1 | | 1/2014 | Wolk |
| 2014/0175707 A1 | | 6/2014 | Wolk |
| 2014/0178646 A1 | | 6/2014 | Wolk |
| 2014/0242343 A1 | | 8/2014 | Free |
| 2015/0079313 A1 | | 3/2015 | Vogel-Martin |
| 2015/0079363 A1 | | 3/2015 | Free |

FOREIGN PATENT DOCUMENTS

| | | |
|---|---|---|
| JP | 09301775 | 11/1997 |
| JP | 2002104875 | * 10/2002 |
| JP | 2003-246623 | 9/2003 |
| JP | 2013-091585 A | 5/2013 |
| JP | 2014-214785 | 11/2014 |
| WO | WO 2008/083282 | 7/2008 |
| WO | WO 2011/082022 | 7/2011 |
| WO | WO 2011/082031 | 7/2011 |
| WO | WO 2013/055432 | 4/2013 |
| WO | WO 2015/038391 | 3/2015 |
| WO | WO 2015/112711 | 7/2015 |

OTHER PUBLICATIONS

Blumenthal, "The Chemical Behavior of Zirconium", Chapter 8, 'Carboxylates of Zirconium', D. Van Nostrand Company, Inc., Princeton, NJ, USA, pp. 311-338, (1958).
Bommel, "The electrical and optical properties of thin layers of nano-sized antimony doped tinoxide particles", J. Materials Sci., 1999, vol. 34, pp. 4803-4809.
Collins, "Measurement of local heat flow in flat evacuated glazing", Intl. J. Heat Mass Transfer, 1993, vol. 36, No. 10, pp. 2553-2563.
Collins, "Current Status of the Science and Technology of Vacuum Glazing", Solar Energy, 1998, vol. 62, No. 3, pp. 189-213.
Eames, "Vacuum glazing: Current performance and future prospects", Vacuum, 2008, vol. 82, pp. 717-722.
Kocer, "Vacuum Insulating Glazing Part I, An Introduction to Design and Performance", Glass on Web, 2006 (7 pages), retrieved from the internet on Jun. 5, 2014, URL <http://www.glassonweb.com/articles/utils/print.php?id=816>.
McHugh, "Supercritical Fluid Extraction: Principles and Practice", Second Edition, Butterworth-Heinemann, Stoneham, MA, USA, 10 pages, (1994).
Wang, "Synthesis of crack-free monolithic $ZrO_2$ aerogel modified by $SiO_2$", J. Porous Mater., 2014, vol. 21, pp. 127-130. (XP-002732449).
Wilson, "Heat Conduction Through the Support Pillars in Vacuum Glazing", Solar Energy, 1988, vol. 63, No. 6, pp. 393-406.
International Search Report for PCT International Application No. PCT/US2014/055389, dated Nov. 27, 2014, 4 pages.
Ma, "High Field Performance of Thin-Walled Spacers in a Vacuum Gap", IEEE Transactions on Dielectrics and Electrical Insulation, Apr. 1, 2000, vol. 7, No. 2, pp. 277-282.
Santa Cruz, "Nanocrystalline $ZrO_2$ ceramics with idealized macropores", Journal of the European Ceramic Society, Jan. 1, 2008, vol. 28, No. 9, pp. 1783-1791.

* cited by examiner

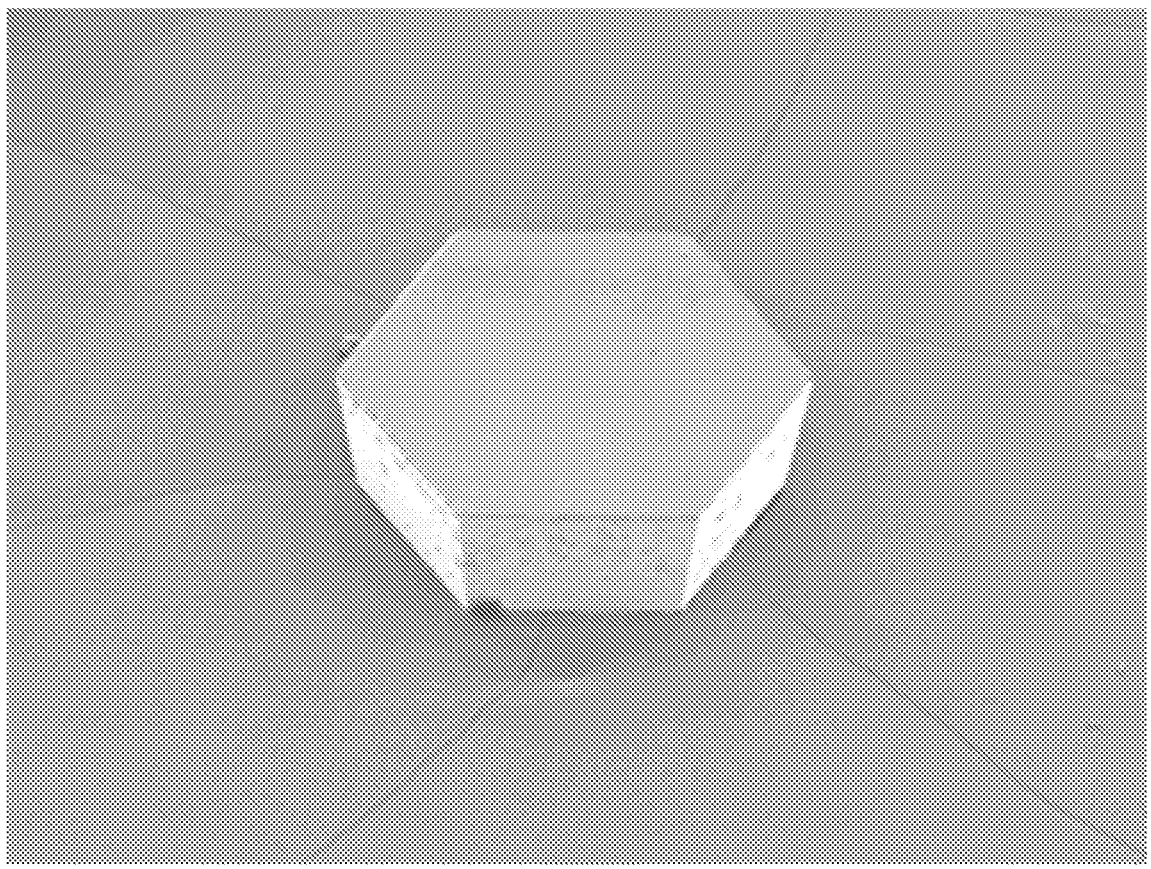
FIG. 6   100μm

METAL OXIDE PARTICLES

CROSS REFERENCE TO RELATED APPLICATIONS

This application is a national stage filing under 35 U.S.C. 371 of PCT/US2014/055389, filed Sep. 12, 2014, which claims the benefit of U.S. Provisional Application No. 62/048,972, filed Sep. 11, 2014, and which claims the benefit of U.S. application Ser. No. 14/025,958, filed Sep. 13, 2013, the disclosures of which are incorporated by reference in their entireties herein.

TECHNICAL FIELD

The present disclosure relates to compositions comprising a plurality of molded particles, methods of making, and articles comprising the same.

BACKGROUND

Metal oxide particles have been disclosed, for example, in WO 2013/055432 (Kolb). Such particles have large dimensions, and need to be tooled into appropriate shapes for some applications. Smaller molded particles have also been disclosed, for example, in U.S. Pat. No. 8,123,828 (Culler); however, such smaller particles are highly fractured. Molded particles that are not highly fractured or cracked would be useful for some applications.

SUMMARY

A composition can comprise at least a first plurality of molded particles, each molded particle of the first plurality of molded particles comprising at least 70 mol percent $ZrO_2$, wherein the first plurality of molded particles are uniform in shape; each of the molded particles of the first plurality of molded particles has a largest dimension of no more than 1 centimeter (cm); and 80 percent or more of the molded particles of the first plurality of molded particles are free of cracks having a maximum dimension greater than 10 micrometers.

The composition can, in some cases, comprise other particles that are not part of the first plurality of molded particles. Such other particles do not necessarily have the same $ZrO_2$ content, shape, size, or lack of cracks as the first plurality of molded particles.

Articles can comprise the composition.

A method of making a composition comprising at least a plurality of first molded particles can comprise adding one or more radically polymerizable surface modifiers to a sol, the sol comprising crystalline metal oxide particles having an average primary particle size no greater than 50 nanometers, wherein at least 70 mol percent of the crystalline metal oxide in the composition is $ZrO_2$, placing the sol into one or more molds, polymerizing the one or more radically polymerizable surface modifiers to convert the sol into a cured intermediate, and heating the cured intermediate at one or more temperatures for one or more periods of time to calcine and sinter the cured intermediate to form a plurality of molded particles.

BRIEF DESCRIPTION OF THE DRAWINGS

FIG. 6 is an SEM micrograph of a hexagonally shaped molded particle.

DETAILED DESCRIPTION

Figure 1:
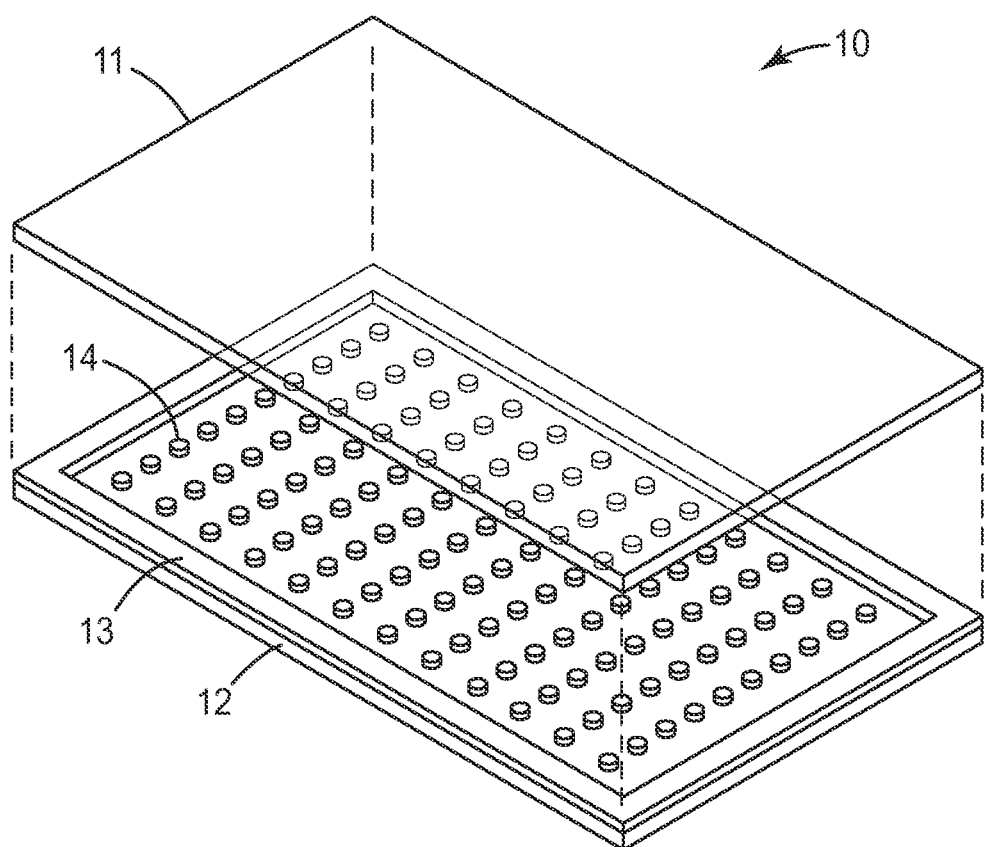
FIG. 1 is an exploded perspective view of a vacuum insulated glass unit.

Throughout the disclosure, singular forms such as "a," "an," and "the" are often used for convenience. However, it should be understood that such singular forms include the plural unless the singular alone is either specified or clearly called for by context.

The terms listed below are afforded particular meanings in this application. All other terms not otherwise defined will be understood by a person of ordinary skill in the art, and are to be afforded the meaning that would have been attributed to them by a person of ordinary skill in the art at the time of the invention.

"Variation" when applied to a physical attribute, such as size or volume, of an element in a set of like elements means the difference in the size of the attribute in the one or more elements having a value for the attribute that is the farthest from the arithmetic mean value for that attribute among all elements of the set from the arithmetic mean value for that attribute among all elements of the set. Variation can be measured in units or as a percent. For example, if a set of three elements A, B, and C have heights of 1.0 cm, 1.1 cm, and 0.9 cm, respectively, then the variation in height of these elements is 0.1 cm, i.e., the difference between the height of the elements having heights that are the farthest from the arithmetic mean of the height of all of the elements (i.e., elements A and C, respectively having heights of 1.1 cm and 0.9 cm) from the arithmetic mean of the height of all of the elements (i.e., one third of the sum of the heights of all three elements, or 1 cm). Alternatively, in the situation described above, the 0.1 cm variation can be considered a variation of 10%.

"Uniform in shape" means that a set of reference items, such as a plurality of particles, have one or more of the following attributes: (a) the variation in volume among the set of reference items is no more than 10%, no more than 5%, or no more than 2%; (b) the variation in size of the one or more smallest dimensions (e.g., height, length, width, depth, etc.) of the set of reference items is no more than 10%, no more than 5%, or no more than 2%; or (c) the variation in size of the one or more largest dimensions (e.g., height, length, width, depth, etc.) of the set of reference items is no more than 10%, no more than 5%, or no more than 2%.

A "crack" is a material segregation or partitioning having a size ratio of 5:1 or greater, 6:1 or greater, 7:1 or greater, 8:1 or greater, 9:1 or greater, 10:1 or greater, 12:1 or greater, or 15:1 or greater in any two dimensions.

A "sol" is a stable colloidal suspension of small solid particles in a continuous liquid medium.

A "primary particle" is an unaggregated and non-agglomerated particle.

"Primary particle size" is the diameter of the smallest sphere that could enclose the reference primary particle.

"Weight percent solids" is the percent by weight of solid material that remains after the removal of all liquids in a composition, such as water and organic solvents, based on the total weight of the composition.

"Molded particles" are particles having a size and shape that is determined by the size and shape of a mold, rather than by a tooling process that shapes the particles.

A composition can comprise at least a first plurality of molded particles. The first plurality of molded particles can comprise at least 70 mol percent zirconia ($ZrO_2$). The first plurality of molded particles can be uniform in shape and size. Quantitatively, the particles in the first plurality of molded particles be uniform in size when all of the plurality of molded particles have a variation in volume that is no more than 10%, no more than 5%, or no more than 2%.

The first plurality of molded particles can have any shape depending on the intended use. Shapes include a disk, a cone, a cylinder, or a polyhedron. An exemplary shape is pyramidal. Spherical shapes are possible; however in most cases the first plurality of molded particles is not spherical in shape. Regardless of what shape is used, the shape has one or more largest dimensions and one or more smallest dimensions. The shape of each of the individual molded particles in the first plurality of molded particles can be essentially the same. Quantitatively, this can occur when the variation in the largest dimension is no more than 10%, no more than 5%, or no more 2%, when the variation in the smallest dimension is no more than 10%, no more than 5%, or no more than 2%, or both.

The one or more largest dimensions of each of the first plurality of molded particles can be no more than 1 cm (10 mm). For example, the one or more largest dimensions of each of the plurality of molded particles can be no more than 7.5 mm, no more than 5 mm, no more than 2.5 mm, no more than 1 mm, no more than 0.75 mm, no more than 0.5 mm, no more than 0.25 mm, no more than 0.01 mm, or no more than 0.05 mm. The one or more largest dimensions of each of the plurality of molded particles can also be 0.05 mm or greater, such as 0.1 mm or greater, 0.25 mm or greater, 0.5 mm or greater, 0.75 mm or greater, 1 mm or greater, 2.5 mm or greater, 5 mm or greater, or 7.5 mm or greater.

The molded particles in the first plurality of molded particles are often polycrystalline, with at least 80% of the first plurality of molded particles being free of cracks having a maximum dimension greater than 10 micrometers. In some cases, at least 85%, at least 90%, at least 95%, or at least 99% of the first plurality of molded particles are free of cracks. The individual particles in the first plurality of molded particles can also be free of cracks having a maximum dimension greater than 9 micrometers, greater than 8 micrometers, greater than 7 micrometers, greater than 6 micrometers, greater than 5 micrometers, greater than 4 micrometers, greater than 3 micrometers, greater than 2 micrometers, or greater than 1 micrometer.

The $ZrO_2$ can be present in 70 to 100 mol percent, such as 70 mol percent or greater, 75 mol percent or greater, 80 mol percent or greater, 85 mol percent or greater, 90 mol percent or greater, 95 mol percent or greater, 97 mol percent or greater, or 99 mol percent or greater. The $ZrO_2$ can be present in 100 mol percent or less, 99 mol percent or less, 97 mol percent or less, 95 mol percent or less, 90 mol percent or less, 85 mol percent or less, 80 mol percent or less, or 75 mol percent or less.

Depending on the intended use, the first plurality of molded particles can contain metal oxides other than zirconia. Rare earth oxides are an example of such metal oxides. When rare earth oxides are included, they can be present in amounts of 1 mol percent or greater, 5 mol percent or greater 10 mol percent or greater, 15 mol percent or greater, 20 mol percent or greater, or 25 mol percent or greater. Rare earth oxides can also be present in 30 mol percent or less, 25 mol percent or less, 20 mol percent or less, 15 mol percent or less, 10 mol percent or less, or 5 mol percent or less. Some molded particles can comprise from 1 mol percent to 30 mol percent rare earth oxides. In this context, the mol percent of rare earth oxide is based on the total mols of metal oxide in the molded particles. Exemplary rare earth oxides include $Y_2O_3$ and $La_2O_3$.

When $Y_2O_3$ is used, it is often present from 1 mol percent to 15 mol percent, such as 1 mol percent or greater, 2 mol percent or greater, 3 mol percent or greater, 4 mol percent or greater, 5 mol percent or greater, 6 mol percent or greater, 7 mol percent or greater, 8 mol percent or greater, 9 mol percent or greater, 10 mol percent or greater, 11 mol percent or greater, 12 mol percent or greater, 13 mol percent or greater, or 14 mol percent or greater. $Y_2O_3$ can also be used in 15 mol percent or less, 14 mol percent or less, 13 mol percent or less, 12 mol percent or less, 11 mol percent or less, 10 mol percent or less, 9 mol percent or less, 8 mol percent or less, 7 mol percent or less, 6 mol percent or less, 5 mol percent or less, 4 mol percent or less, 3 mol percent or less, or 2 mol percent or less. When $La_2O_3$ is used, it is often present from 1 mol percent to 5 mol percent, such as 1 mol percent or greater, 2 mol percent or greater, 3 mol percent or greater or 4 mol percent or greater. $La_2O_3$ can also be present in amounts of 5 mol percent or less, 4 mol percent or less, 3 mol percent or less, or 2 mol percent or less.

Other metal oxides can also be used. For example, the first plurality of molded particles can further comprise $Al_2O_3$. When used, the first plurality of molded particles can comprise $Al_2O_3$ in amounts of 0.05 mol percent or greater, 0.1 mol percent or greater, or 0.25 mol percent or greater. The amount of $Al_2O_3$ can also be 0.5 mol percent or less, 0.25 mol percent or less, or 0.1 mol percent or less. For example, the amount of $Al_2O_3$ can be from 0.01 mol percent to 0.5 mol percent of the total amount of metal oxides in the first plurality of molded particles.

Other metal oxides that can be used in the first plurality of molded particles include one or more of $CeO_2$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Fe_2O_3$, $MnO_2$, $Co_2O_3$, $Cr_2O_3$, $NiO$, $CuO$, $Bi_2O_3$, and $Ga_2O_3$. One or more of these other metal oxides can be used in amounts of 1 mol percent or greater, 5 mol percent or greater, 10 mol percent or greater, 15 mol percent or greater, 20 mol percent or greater, or 25 mol percent or greater. One or more of these other metal oxides can also be present in 30 mol percent or less, 25 mol percent or less, 20 mol percent or less, 15 mol percent or less, 10 mol percent or less, or 5 mol percent or less.

One or more of the other metal oxides discussed herein can be used in the amounts discussed herein in order to change the physical properties of the molded particles. Use of such other metal oxides, including but not limited to the use of $Y_2O_3$, $La_2O_3$, or both, can affect the crystal structure of the $ZrO_2$ in the particles.

When no other metal oxides are used, $ZrO_2$ can have several phases, including cubic, tetragonal, and monoclinic; it can also be present in more than one phase in the same particle. When no other metal oxides are present, the phase or phases in which $ZrO_2$ exists can relate to the heat treatment of the $ZrO_2$. The monoclinic phase is stable from ambient temperature to about 1,200° C., the tetragonal phase is stable from about 1,200° C. to about 2,370° C., and the cubic phase is stable above 2,370° C. Sintering zirconia can require temperatures above 1,200° C. Therefore the monoclinic phase often transforms to the tetragonal phase during sintering, and then transforms back to the monoclinic phase upon subsequent cooling. These transformations can be accompanied by volume expansion, which can crack or fracture the metal oxide.

Addition of $Y_2O_3$, $La_2O_3$, or both, to the $ZrO_2$ can prevent the destructive transformation. For example, in some cases the use of 2 mol percent or more of $Y_2O_3$ can allow the tetragonal phase to be maintained as a metastable phase during cooling. When more than about 8 mole percent $Y_2O_3$ is used, the cubic phase that can form at sintering temperatures can be retained during cooling. Between these levels of yttria a mixture of the tetragonal and cubic phases can be formed during sintering, and in many cases those phases can be retained during cooling. Under rapid cooling conditions the cubic phase may be distorted to form another tetragonal phase known as tetragonal prime. When $La_2O_3$, or both $Y_2O_3$ and $La_2O_3$ are used, the appropriate amount will depend on what other metal oxides, if any, are present as well as the desired properties of the final product.

Because the cubic and tetragonal phases provide particles with the greatest strength and toughness, it can be desirable to stabilize the $ZrO_2$ in one or both of those phases and minimize conversion to the monoclinic phase. Addition of $Y_2O_3$, $La_2O_3$, or both in the amounts disclosed can stabilize the cubic and tetragonal phases of $ZrO_2$ in the molded particles, thereby increasing or maintaining the physical integrity, toughness, or both, of the plurality of particles.

Additional metal compounds can be used as coloring agents in order to impart coloration to the first plurality of molded particles. Such coloring agents include one or more of $Fe_2O_3$, $MnO_2$, $CO_2O_3$, $Cr_2O_3$, $NiO$, $CuO$, $Bi_2O_3$, $Ga_2O_3$, $Er_2O_3$, $Pr_2O_3$, $Eu_2O_3$, $Dy_2O_3$, $Sm_2O_3$, $V_2O_5$, $W_2O_5$ or $CeO_2$. When employed, such coloring agents are typically present in amounts of 10 ppm or greater, 100 ppm or greater, 500 ppm or greater, 1,000 ppm or greater, 2,500 ppm or greater, 5,000 ppm or greater, 10,000 ppm or greater, 12,500 ppm or greater, 15,000 ppm or greater, or 17,500 ppm or greater, based on the total content of all of the metal oxides in the first plurality of molded particles. Such coloring agents can also be present in amounts of 20,000 ppm or less, 17,500 ppm or less, 15,000 ppm or less, 12,500 ppm or less, 10,000 ppm or less, 7,500 ppm or less, 5,000 ppm or less, 2,500 ppm or less, 1,000 ppm or less, 500 ppm or less, 100 ppm or less, or 50 ppm or less, based on the total content of all of the metal oxides in the first plurality of molded particles. For example, one or more of the coloring agents discussed herein can be used in amounts ranging from 10 ppm to 20,000 ppm, based on the content of metal oxides.

The composition can include particles other than the first plurality of molded particles. Such particles need not have the same properties, such as $ZrO_2$ content, size, uniformity, or crack-free characteristics, as the first plurality of molded particles. Thus, the composition can comprise, for example, a first plurality of molded particles as described herein and one or more additional particles that have $ZrO_2$ content of less than 70 mol percent. As another example, the composition can comprise a first plurality of molded particles as described herein and one or more additional particles that have a largest dimension greater than 1 cm.

When the composition comprises one or more additional particles that are different from the first plurality of molded particles, the one or more additional particles can include a second plurality of molded particles. The second plurality of molded particles can have one or more of a different chemical composition, a different shape, a different volume, a different longest dimension, a different shortest dimension, and a different size than the first plurality of molded particles. The composition can further include still other additional particles, which can be molded particles or other particles. Thus, the composition can also include a third plurality of molded particles, a fourth plurality of molded particles, and so forth, wherein each further plurality of molded particles is different from the first plurality of molded particles. The one or more additional particles can be molded, for example according to the processes discussed herein or according to some other process, although this is not required since one or more additional particles that are not molded can also be part of the composition.

The composition comprising at least a first plurality of molded particles can be made by any suitable process. One such process involves adding one or more radically polymerizable surface modifiers to a sol, the sol comprising crystalline metal oxide particles having an average particle size no greater than 50 nanometers, such as no greater than 40 nanometers, no greater than 30 nanometers, or no greater than 25 nanometers, wherein at least 70 mol percent of the crystalline metal oxide in the composition is $ZrO_2$.

The sol can be prepared by any suitable methods. One such method involves the use of one or more hydrothermal reactors. For example, the sol can be prepared by hydrothermal treatment of a feedstock containing aqueous metal salts. The aqueous metal salts can be in the form of a solution, a suspension, or a combination thereof wherein some of the salts are dissolved while others are suspended.

The aqueous metal salts can be soluble in water. In such cases, the feedstock containing the aqueous metal salts is often an aqueous medium. The aqueous medium can be water or a mixture of water with other water soluble or water miscible solvents. The other water soluble or water miscible solvents can increase the solubility of the aqueous metal salts, and can include one or more of acetone, 1-methoxy-2-propanol, ethanol, isopropanol, ethylene glycol, N,N-dimethylacetamide, and N-methyl pyrrolidine, and the like. When present, these solvents are typically present in no more than 20% by weight relative to the total weight of the feedstock, such as no more than 15% by weight, no more than 10% by weight, or no more than 5% by weight, in all cases relative to the total weight of the feedstock.

The pH of the feedstock can be acidic. For example, the pH can be less than 6, less than 5, or even less than 4. In some cases, the pH of the feedstock is from 3 to 4. The pH of the feedstock can be adjusted to appropriate levels by the addition of one or more acids or one or more bases. Typically, the acids are mineral acids such as hydrochloric acid, nitric acid, or sulfuric acid; acetic acid can also be used. Typically, the bases are alkali metal hydroxides, such as sodium hydroxide or potassium hydroxide; bicarbonate, carbonate, and organic bases such as alkali metal ethoxide can also be used.

The liquid feedstock can be deionized or treated by reverse osmosis prior to adding the desired metal salts and prior to adjusting the pH to the appropriate level. Such deionization or reverse osmosis can minimize the amount of unwanted ions in the feedstock. Common ions that are often unwanted include one or more of alkali metal ions and alkaline earth metal ions.

A majority of the dissolved salts in the feedstock are usually carboxylate salts, rather than halide salts, oxyhalide salts, nitrate salts, or oxynitrate salts. Such carboxylate can favor the formation of molded particles having a cubic or tetragonal crystal structure rather than a monoclinic crystal structure. Any carboxylate anion can be used as the anion in the carboxylate metal salt. Common carboxylate anions can have no more than four carbon atoms. Exemplary carboxylate anions include one or more of formate, acetate, propionate, and butyrate, or a combination thereof. The carboxylate anions salts are often acetate anions. The feedstock can further include, for example, the corresponding carboxylic acid of the carboxylate anion. For example, feedstocks prepared from acetate salts often contain acetic acid.

One example of a zirconium salt is zirconium acetate salt, which can be represented by the chemical formula $ZrO_{((4-n)/2)}+(CH_3COO-)_n$, where n is from 1 to 2. The value of n can depend on a variety of factors, such as the pH of the feedstock. Methods of making zirconium acetate are described, for example, in W. B. Blumenthal, "The Chemical Behavior of Zirconium," pp. 311-338, D. Van Nostrand Company, Princeton, N.J. (1958). Suitable aqueous solutions of zirconium acetate are commercially available, for example, from Magnesium Elektron, Inc., Flemington, N.J. Such solutions can contain, for example, up to 17 weight percent zirconium, up to 18 weight percent zirconium, up to 20 weight percent zirconium, up to 22 weight percent, up to 24 weight percent, up to 26 weight percent, and up to 28 weight percent zirconium, based on the total weight of the solution.

Other metal salts in the feedstock, such as yttrium salts, lanthanide element salts, and aluminum salts, can also be carboxylate salts. Such carboxylate salts are commercially available. Because these salts are typically used at much lower concentration levels than the zirconium salt, salts other than carboxylate salts can also be used. Typically, using anions other than carboxylate for such other metal salts has no deleterious effect on the process or final product.

The total amount of the various metal salts dissolved in the feedstock can be readily determined based on the total percent solids selected for the feedstock. The relative amounts of the various salts can be calculated to provide the desired chemical composition of the plurality of molded particles.

The feedstock can contain 5 or more weight percent solids. In some cases, the weight percent solids can be 10 or more, 11 or more, 12 or more, 13 or more, 14 or more, or 15 or more. The weight percent solids can be no more than 19, no more than 20, no more than 21, no more than 22, no more than 23, no more than 24, or no more than 25. The weight percent solids can be in a range from 10 to 25, such as from 12 to 22, from 14 to 20, or from 15 to 19.

When subjected to hydrothermal treatment, the various dissolved salts in the feedstock can undergo hydrolysis and condensation reactions to form the primary particles of the sol. These reactions can be accompanied by the release of an acidic byproduct. The byproduct can be one or more carboxylic acids corresponding to the carboxylate anions used for the metal salts, plus any other carboxylate salts in the feedstock. For example, if the zirconium salt is zirconium acetate, then acetic acid can be formed as a byproduct of the hydrothermal reaction.

Any suitable hydrothermal reactor can be used for the preparation of the primary particles of the sol. The reactor can be a batch reactor or a continuous reactor. The heating times are typically shorter and the temperatures are typically higher in a continuous hydrothermal reactor compared to a batch hydrothermal reactor. The time of the hydrothermal treatments can be varied depending, for example, on the type of reactor, the temperature of the reactor, and the concentration of the feedstock. The pressure in the reactor can be autogenous, wherein the vapor pressure of the reactor is the vapor pressure of the aqueous medium of the feedstock at the temperature of the reactor. The pressure in the reactor can also be hydraulic, wherein the pressure is set by pumping a fluid against a restriction. For example, the pressure can be set to a desired level by adding an inert gas, such as nitrogen or argon, into the reactor.

Suitable batch hydrothermal reactors are available, for example, from Parr Instruments Co., Moline, Ill. Some suitable hydrothermal reactors are described, for example, in U.S. Pat. No. 5,453,262 (Dawson) and U.S. Pat. No. 5,652,192 (Matson), as well as in Adschiri et al., J. Am. Ceram. Soc., 75, 1019-1022 (1992), and Dawson, Ceramic Bulletin, 67 (10), 1673-1678 (1988). Processes of operating such reactors to produce metal oxide particles are disclosed, for example, in WO 2013/055432 (Kolb)

If a batch reactor is used, the temperature is often in a range from 160° C. to 275° C., such as 160° C. to 250° C., 170° C. to 250° C., 175° C. to 250° C., 200° C. to 250° C., 175° C. to 225° C., 180° C. to 220° C., 180° C. to 215° C., or 190° C. to 210° C. Thus, the temperature can be 160° C. or greater, 170° C. or greater, 180° C. or greater, or 190° C. or greater. The temperature can also be 250° C. or less, 220° C. or less, 215° C. or less, or 210° C. or less.

If a batch reactor is used, the feedstock can be placed in the batch reactor at room temperature. The feedstock within the batch reactor can then be heated to an appropriate temperature, such as those discussed above, and held at that temperature for at least 30 minutes, for example, at least 1 hour, at least 2 hours, or at least 4 hours. The temperature can be maintained for up to 24 hours, for example, up to 20 hours, up to 16 hours, or up to 8 hours. In some cases, an appropriate temperature can be maintained from 0.5 to 24 hours, such as from 1 to 18 hours, 1 to 12 hours, or 1 to 8 hours. The size of the batch reactor can be selected depending on the amount of sol that is to be produced in each batch. For example, the volume of the batch reactor can be in a range from several milliliters to several liters or more. Exemplary volumes are 2 mL or more, 5 mL or more, 10 mL or more, 25 mL or more, 50 mL or more, 100 mL or more, 250 mL or more 500 mL or more, 750 mL or more, 1 L or more, 2 L or more, 5 L or more, 10 L or more, 25 L or more, or 50 L or more. Exemplary volumes can be 100 L or less, 50 L or less, 25 L or less, 10 L or less, 5 L or less, 2 L or less, 1 L or less, 750 mL or less, 500 mL or less, 250 mL or less, 100 mL or less, 50 mL or less, 25 mL or less, 10 mL or less, or 5 mL or less.

Instead of using a batch reactor, the feedstock can be passed through a continuous hydrothermal reactor. In such reactors the feedstock is continuously introduced and an effluent continuously removed from a heated zone of the reactor. The introduction of feedstock and the removal of the effluent typically occur at different locations of the reactor. The continuous introduction and removal can be constant or pulsed.

When a continuous hydrothermal reactor is used, the temperature and the residence time (i.e., the average time that the feedstock is within a heated portion of the continuous hydrothermal reactor) in the reactor are typically selected so that the particular reactor will convert at least 90 mole percent of the metal salts, such as zirconium acetate, in the feedstock into particles after a single pass through the continuous hydrothermal reactor.

The reactor temperature in continuous hydrothermal reactors can be from 170° C. to 275° C., 170° C. to 250° C., 170° C. to 225° C., 180° C. to 225° C., 190° C. to 225° C., 200° C. to 225° C., or 200° C. to 220° C. Thus, the temperature can be 170° C. or greater, 180° C. or greater, 190° C. or greater, or 200° C. or greater. The temperature can also be 250° C. or less, 225° C. or less, 220° C. or less, or 200° C. or less. In some continuous hydrothermal reactors, temperatures above 275° C. can result in pressures that are too high for the continuous hydrothermal reactor to function properly. In some continuous hydrothermal reactors, temperatures lower than 170° C. can require unacceptably long residence times to give adequate conversion of the zirconium in the feedstock.

Alternatively, in a multiple step hydrothermal process the feedstock is passed through a heated portion of the continuous hydrothermal reactor more than once. For example, the feedstock can be subjected to a first hydrothermal treatment to form a zirconium-containing intermediate and a byproduct such as a carboxylic acid. A second feedstock can be formed by removing at least a portion of the byproduct of the first hydrothermal treatment from the zirconium-containing intermediate. The second feedstock can then be subjected to a second hydrothermal treatment to form the sol containing the metal oxide particles. Such processes are described, for example, in U.S. Pat. No. 7,241,437 (Davidson)

In a two-step hydrothermal process, the percent conversion of the zirconium-containing intermediate can be from 40 to 75 mol percent. The conditions, such as temperature, pressure, and residence time, used in the first hydrothermal treatment can be adjusted to provide conversion within this range. Any suitable methods, such as one or more of vaporization, dialysis, ion exchange, precipitation, and filtration, can be used to remove at least part of the byproduct of the first hydrothermal treatment.

Regardless of whether the hydrothermal reactor is a continuous reactor or a batch reactor, the product obtained from the hydrothermal reactor is typically a sol. The sol can contain metal oxide particles in the aqueous medium. The particles can contain 70 mol percent or more of $ZrO_2$. Depending on the type and amount of the other metal salts used in the feedstock, the particles in the sol can also contain one or more additional metal oxides, such as those discussed above. The particles can be crystalline and can have an average primary particle size no greater than 50 nanometers.

The sol can be concentrated to increase the percent solids. Concentrating the sol can involve removing less than all of the aqueous medium. Any suitable method for removing the aqueous medium can be used. For example, part of the aqueous medium can be vaporized at ambient temperature, under mild heating (i.e., heating that does not affect the composition, crystal structure, or properties of the particles in the sol), under reduced pressure, or a combination thereof.

In addition to water and co-solvents, the aqueous medium can also contain dissolved carboxylic acids and salts thereof that are present in the feedstock or that are byproducts of the reactions that occur within the hydrothermal reactor. At least some of these dissolved carboxylic acids and salts thereof can be removed by any suitable method. Suitable methods include diafiltration and dialysis.

When dialysis is used, a sample of the sol can be placed within a membrane bag, the porosity of which is chosen such that the carboxylic acids and salts thereof can pass through the membrane but the metal oxide particles cannot pass through the membrane. The membrane bag can be closed and placed within a water bath. The carboxylic acid and salts thereof are allowed to diffuse out of the membrane bag. The water in the bath can be replaced several times to promote diffusion of the carboxylic acids and salts thereof out of the membrane bag and into the water bath.

In a diafiltration process, the sol can be filtered through a membrane that is permeable to the carboxylic acids and salts thereof but impermeable to the metal oxide particles. Thus, the metal oxide particles can be retained on the membrane. In a discontinuous diafiltration process, the sample can be diluted to a pre-determined volume and then concentrated to a desired volume by ultrafiltration. The dilution and concentration steps are repeated until the amount of carboxylic acid and salts thereof is reduced to an acceptable concentration level. In a continuous diafiltration process, which is sometimes referred to as a constant volume diafiltration process, fresh water, such as reverse osmosis water or deionized water, is added at the same rate that aqueous medium is removed through filtration. The dissolved carboxylic acid or salts thereof are in the aqueous medium that is removed.

When additional metal salts, such as lanthanum or yttrium salts, are present, most of the additional metals can be incorporated into the crystalline zirconia particles. However a fraction of those metals can be removed during the diafiltration or dialysis process. Thus, the relative amounts of the various metal oxides in the sol can change upon diafiltration or dialysis. For example, dialysis of a sol produced with a $ZrO_2:Y_2O_3:La_2O_3$ molar ratio of 95.7:2.3:2 resulted in a sol with a $ZrO_2:Y_2O_3:La_2O_3$ molar ratio of 96.5:2.2:1.3. In another example, dialysis of a sol produced with a $ZrO_2:Y_2O_3$ molar ratio of 88:12 resulted in a sol with a $ZrO_2:Y_2O_3$ molar ratio of 90.7:9.3. The change in content of other compositions in the form of a sol upon dialysis or diafiltration can be calculated from these data using rule of mixtures.

One or more radically polymerizable surface modifiers can be added to the sol. The one or more radically polymerizable surface modifiers are typically added after any concentration step, such as diafiltration or dialysis, to ensure that the one or more radically polymerizable surface modifiers are not removed during the concentration step.

Suitable radically polymerizable surface modifiers include ethylenically unsaturated surface modifiers. Such ethylenically unsaturated surface modifiers can include ethylenically unsaturated acids, reaction products of alcoholic polymerizable monomers with cyclic anhydrides, and ethylenically unsaturated organosilanes. Specific examples include, acrylic acid, methacrylic acid, beta-carboxyethyl acrylate, 2-(methacryloxyethyl)succinate, hydroxyethyl acrylate, hydroxyethyl methacrylate, hydroxypropyl acrylate, hydroxyproyl methacrylate, hydroxylbutyl acrylate, hydroxybutyl methacrylate, alkyltrialkoxysilanes methacryloxyalkyltrialkoxysilanes, acryloxyalkyltrialkoxysilanes such as 3-methacryloxypropyltrimethoxysilane, 3-acryloxypropyltrimethoxysilane, and 3-(methacryloxy)propyltriethoxysilane, 3-(methacryloxy)propylmethyldimethoxysilane, 3-(acryloxypropyl)methyldimethoxysilane), methacryloxyalkyldialkylalkoxysilanes, acyrloxyalkyldialkylalkoxysilanes such as 3-(methacryloxy)propyldimethylethoxysilane; mercaptoalkyltrialkoxylsilanes such as 3-mercaptopropyltrimethoxysilane, aryltrialkoxysilanes such as styrylethyltrimethoxysilane, and vinylsilanes such as vinylmethyldiacetoxysilane, vinyldimethylethoxysilane, vinylmethyldiethoxysilane, vinyltrimethoxysilane, vinyltriethoxysilane, vinyltriacetoxysilane, vinyltriisopropoxysilane, vinyltrimethoxysilane, and vinyltris(2-methoxyethoxy)silane).

Additional radically polymerizable compounds that do not modify the surface of the particles in the sol can also be added. Examples include monomers, such as (meth)acrylate monomers, styrenyl monomers, and epoxy monomers, as well as polymers and oligomers such as oligo- or polyesters having (meth)acrylate groups, oligo- or polyurethanes having (meth)acrylate groups, oligo- or polyethers having (meth)acrylate groups, and oligo- or polyacrylics.

The step of adding the one or more radically polymerizable surface modifiers can also include adding one or more radical initiators. Suitable radical initiators include azobisisobututyronitrile, 2,2'-azodi-(2,4-dimethylvaleronitrile), 1,1'-azobis(cyclohexanecabonitrile), benzoyl peroxide and lauryl peroxide. In particular, UV active radical initiators are often used. Such initiators include acetophenones, benzophenones, and thioxanthones. Specific examples include 1-hydroxycyclohexyl benzophenone, 4-(2-hydroxyethoxy) phenyl-(2-hydroxy-2-propyl) ketone, 2-hydroxy-2-methylpropiophenone, and bis(2,4,6-trimethylbenzoyl)-phenylposphineoxide, all of which are commercially available.

The sol can then be placed into one or more molds. Each of the one or more molds can have at least one cavity; in most cases, each of the one or more molds has a plurality of cavities. The plurality of cavities in a mold can be formed in a belt, sheet, continuous web, or die, containing the one or more cavities. Use of one of the above-mentioned forms for the mold can be useful when the mold is to be used in a continuous process of forming molded particles.

The one or more molds can comprise one or more polymeric materials. Any suitable polymeric materials can be used. For example, the polymeric material can be one or more of polyester, polycarbonate, poly(ether sulfone), poly (methyl methacrylate), polyurethane, polyvinylchloride, polyolefin, polystyrene, polypropylene, and polyethylene. In some cases, the entire one or more molds are made from one or more polymeric materials. In other cases, only the surfaces of the one or more molds that are designed to contact the sol, such as the surface of the one or more cavities, are made of one or more polymeric materials. For example, when the one or more molds are made from metal, glass, ceramic, or the like, one or more surfaces of the one or more molds can have a coating of a polymeric material.

The one or more molds can be replicated from a master tool. A master tool can have a pattern that is the inverse of the pattern that is on the mold in that the master tool can have protrusions that correspond to the cavities on the mold. The master tool can be made of metal, such as nickel or an alloy thereof. To make the one or more molds, a polymeric sheet can be heated and placed next to the master tool. The polymeric sheet can then be pushed against the master tool to emboss the polymeric sheet, thereby forming a mold. It is also possible to extrude or cast one or more polymeric materials onto a master tool in order to produce the one or more molds. Many other types of mold materials, such as metal, can be embossed by a master tool in a similar manner. Disclosures related to forming molds from master tools include U.S. Pat. No. 5,125,917 (Pieper), U.S. Pat. No. 5,435,816 (Spurgeon), U.S. Pat. No. 5,672,097 (Hoopman), U.S. Pat. No. 5,946,991 (Hoopman), U.S. Pat. No. 5,975,987 (Hoopman), and U.S. Pat. No. 6,129,540 (Hoopman).

The one or more cavities in the mold can be any desired three-dimensional shape. Exemplary shapes include disks, cones, cylinders, and polyhedrons. Each mold often has a plurality of uniform cavities having the same size and shape.

In some cases, each mold can have a plurality of first uniform cavities having a first size and a first shape and a plurality of second uniform cavities having a second size and a second shape, wherein one or both of the second size and second shape can be different from one or both of the first size and first shape. Further pluralities of cavities can also be present on the one or more molds, and can have further different sizes and shapes. Use of one or more molds having more than one plurality of cavities, the more than one plurality of cavities each having a different size, shape, or both, can provide more than one plurality of molded particles, each plurality of molded particles having a different size, shape, or both. For example, when the one or more molds have a plurality of first uniform cavities having a triangular shape and of second uniform cavities having a disk shape, the resulting composition will have a first plurality of molded particles having a triangular shape and a second plurality of molded particles having a disk shape. In many cases, the first plurality of molded particles are not in the shape of teeth.

In order to make a plurality of molded particles with one or more largest dimensions of no more than 1 cm, the one or more cavities can each have one or more largest dimensions of that is no more than 1 cm (10 mm), such as no more than 7.5 mm, no more than 5 mm, no more than 2.5 mm, no more than 1 mm, no more than 0.75 mm, no more than 0.5 mm, no more than 0.25 mm, no more than 0.01 mm, or no more than 0.05 mm. The one or more largest dimensions of each of the one or more cavities can also be 0.05 mm or greater, such as 0.1 mm or greater, 0.25 mm or greater, 0.5 mm or greater, 0.75 mm or greater, 1 mm or greater, 2.5 mm or greater, 5 mm or greater, or 7.5 mm or greater.

In some cases, the one or more cavities can be free of release agents. This can be beneficial because it can help ensure that the contents of the mold stick to the mold walls and maintain the shape of the mold. In some cases, release agents can be applied to the surfaces of the cavities to ensure clean release of the molded particles from the mold.

The one or more cavities, whether coated with mold release agent or not, can be filled with the sol. The sol can placed into the one or more cavities by any suitable methods. Examples of suitable methods include pumping through a hose, use of a knife roll coater, or use of a die such as a vacuum slot die. A scraper or leveler bar can be used to force the sol into the one or more cavities, and to remove any of the sol that does not fit into the one or more cavities. Any portion of sol that does not fit into the one or more cavities can be recycled and used again later, if desired.

Dissolved oxygen can be removed from the sol, either before the sol is placed in the one or more molds or while the sol is in the one or more molds. This can be achieved by vacuum degassing or sparging with an inert gas such as nitrogen or argon. Removing dissolved oxygen can reduce the instance of unwanted side reactions, particularly unwanted reactions that involve oxygen. Because such side reactions are not necessarily detrimental to the product, and do not occur in all circumstances, removing dissolved oxygen is not required.

The sol can be cured by polymerizing the radically polymerizable surface modifiers and, if they are used, the additional radically polymerizable compounds. This curing can be carried out by any curing method. One exemplary curing method is heat curing, whereby the sol is heated to a temperature sufficient to initiate a radical reaction. When a heat-activated radical initiator is used, this temperature is often from 60° C. to 100° C. When a photoinitiator is used, curing can be carried out by exposing the sol to actinic radiation. The actinic radiation is often in a wavelength where an added photoinitiator has a strong absorbance. Such wavelengths can include, for example, visible, ultraviolet, and the like.

In most cases, curing can occur while a sol is in the mold. However, it can also be possible to pre-cure the composition and then put the cured or partially cured composition into the mold.

Curing changes the sol to a cured intermediate. The cured intermediate is often in the form of a gel. The cured intermediate contains a solid or semi-solid matrix with liquid entrapped therein. The liquid in the cured intermediate is often mostly water. The water can be exchanged with a second liquid to remove some of the water. When the second liquid is alcohol, this exchange is known as alcohol exchange. Alcohol exchange can be accomplished by soaking the gel in a dry alcohol, that is, an alcohol with no dissolved water. An exemplary dry alcohol is 200 proof ethanol. Removing water by alcohol exchange can be useful because many alcohols, such as ethanol and methanol, are more volatile than water and therefore easier to remove from the gel.

After curing, the cured intermediate can be dried. Drying can cause the cured intermediate to take the form of one or more aerogels or one or more xerogels. Drying can comprise removing solvent from the cured intermediate without excessively shrinking the cured intermediate. Thus, the cured intermediate can lose no more than 30% of its volume, such as no more than 25% of its volume, no more than 20% of its volume, no more than 15% of its volume, no more than 10% of its volume, no more than 9% of its volume, no more than 8% of its volume, no more than 7% of its volume, no more than 6% of its volume, no more than 5% of its volume, no more than 4% of its volume, no more than 3% of its volume, no more than 2% of its volume, or no more than 1% of its volume upon drying.

The drying can be accomplished by any suitable means. In some cases, the solvent in the cured intermediate is allowed to evaporate at ambient temperature. Drying can also be accomplished at elevated temperatures, which can be no more than 200° C., no more than 175° C., no more than 150° C., or no more than 125° C. Elevated drying temperatures can be 25° C. or greater, such as 30° C. or greater, 50° C. or greater, 75° C. or greater, 100° C. or greater, 125° C. or greater, or 150° C. or greater. In other cases, the solvent can be removed by supercritical extraction. In a supercritical extraction process, a supercritical fluid, such as supercritical carbon dioxide, can be contacted with the cured intermediate in order to remove solvents, such as alcohols, for example, ethanol, that are soluble in the supercritical fluid. The metal oxide particles and polymerized surface modifiers, as well as the polymerized additional polymerizable compounds, if used, are typically not soluble in the supercritical fluid and therefore are not removed. Supercritical extraction is discussed in detail in van Bommel, M. J., and de Haan, A. B. *J. Materials Sci.* 29 (1994) 943-948, Francis, A. W. *J. Phys. Chem.* 58 (1954) 1099-1114 and McHugh, M. A., and Krukonis, V. J. *Supercritical Fluid Extraction: Principles and Practice*. Stoneham, Mass., Butterworth-Heinemann, 1986.

Once dried, the cured intermediate contains the metals used in the feedstock in the form of metal oxides, as well as polymerized or cured versions of the radically polymerizable surface modifiers and, if used, polymerized or cured versions of the additional radically polymerizable compounds. The organic content of the cured intermediate after drying is typically 3% or greater, such as 4% or greater, 5% or greater, 6% or greater, 10% or greater, 15% or greater, 20% or greater, or 25% or greater. The organic content of the cured intermediate after drying is often no more than 30%, such as no more than 25%, no more than 20%, no more than 15%, no more than 10%, or no more than 5%.

After drying, the cured intermediate can be calcined and sintered to form the plurality of molded particles. Calcining and sintering can be accomplished by heating the cured intermediate to at least one temperature for at least one time. Calcining, which can occur first, can involve removal of any organic compounds from the metal oxides. Calcining can entail heating at a rate of 1° C. per hour to 600° C., such as 5° C. or more, 10° C. per hour or more, 50° C. per hour or more, 100° C. or more, 200° C. per hour or more, 300° C. or more, 400° C. or more, or 500° C. or more. The heating rate can also be 600° C. per hour or less, 500° C. per hour or less, 400° C. per hour less, 300° C. per hour less, 200° C. per hour less, 100° C. per hour less, 50° C. per hour less, or 20° C. per hour less. The temperature increase can be stopped once a temperature of 600° C. is reached. This heating profile can allow organic compounds to vaporize without causing cracks. The temperature can be maintained at 600° C. until organic compound removal is complete. Removal of organic compounds can be tracked by thermogravimetic analysis. Organic compound removal can be complete when only incidental loss of mass is detected by thermogravimetric analysis. For example, when only incidental mass change is detected by thermogravimetric analysis after the aerogel is held at a high temperature, such as 500° C. to 750° C., for example 600° C., for a time period such as 15 minutes, 30 minutes, 45 minutes, 1 hours, 1.25 hours, 1.5 hours, 1.75 hours, or 2 hours, then organic compound removal can be complete. Incidental mass change can be a mass loss of, for example, less than 1%, less than 0.5%, less than 0.25%, less than 0.1%, less than 0.075%, less than 0.05%, less than 0.025%, less than 0.01%, less than 0.0075%, less than 0.005%, less than 0.0025%, or less than 0.001% after holding the organic compound at high temperature for the time period. In some cases, organic compound removal is not complete after the calcining step. In such cases, additional organic compounds can be removed during the sintering step, if needed.

Sintering can take place after the organic compounds are partially or completely removed. The rate of temperature increase can be faster once the organic compounds are no longer present, because there is no longer any concern that vaporized organic compounds will cause cracks. Thus, the temperature can be increased at a rate of 100° C. per hour to 600° C. per hour, until a temperature of 800° C. to 1,350° C. is reached. This temperature can be maintained for sufficient time to sinter the resulting plurality of molded particles, thereby providing the plurality of molded particles with extra physical strength without disrupting their pore structure. Typical sintering times are up to 10 hours, such as 5 hours, up to 4 hours, up to 3 hours, or up to 2 hours. Sintering times can be 1 hour or more, such as 2 hours or more, 3 hours or more, or 4 hours or more.

After sintering, the first plurality of molded particles can be ready to use, and typically do not require further processing steps, such as milling, cutting, or shaping, in order to be converted into a desired shape. Instead, the shape of the plurality of molded particles is determined by the shape of the mold. In some cases, depending on the intended use, the plurality of molded particles can be treated with one or more surface modifying agents to modify the surface of the plurality of molded particles.

Molded particles that are free of cracks with a maximum dimension greater than 10 micrometers can be useful for many applications, especially those that require molded particles with high structural integrity. As such, the composition comprising a plurality of molded particles can have a variety of uses. For example, a composition comprising a first plurality of molded particles can be used in a variety of articles. One such article is a vacuum insulated glass unit. Such units include two glass planes and an edge seal between the glass planes with a substantial vacuum gap between them. The composition comprising a first plurality of molded particles can be used to separate two sheets of glass in vacuum insulated glass units.

In a vacuum insulated glass unit, particles are often laid out as a grid, with the space between the particles ranging from about 20 millimeters to about 45 millimeters. Thus, a vacuum insulated glass unit that is 20 cm by 20 cm would have about 81 particles in the first plurality of molded particles if the particles were laid out in a 20 millimeter grid, or about 16 particles in the first plurality of molded particles if the particles were laid out in a 45 millimeter grid. A larger window with a size of one square meter would require a first plurality of particles with about 500 to 2,400 particles, depending on the grid spacing.

Thus, the number of particles in the first plurality of molded particles can vary depending on the use. For some experimental uses, the first plurality of molded particles can have 2 or more particles. In some applications, such as for use in small vacuum insulated glass units, the number of particles in the first plurality of molded particles can have 10 or more, 20 or more, 50 or more, 75 or more, 100 or more, or 250 or more. For other uses, for example, in larger vacuum insulated glass units, number of particles in the first plurality of molded particles can be 500 or more, 1,000 or more, 2,000 or more 5,000 or more, 7,500 or more, 10,000 or more, 20,000 or more, 50,000 or more, 100,000 or more, 200,000 or more, or 300,000 or more. Because of their small size, a large number of particles can be present in a low weight. Assuming that the density of the particles is approximately equal to the density of zirconia (6.05 g/L), one kg of a cylindrically shaped plurality of particles having a diameter of 500 micrometers and a height of 500 micrometers would contain approximately 1,685,000 particles. If the cylindrically shaped plurality of particles has a diameter of 500 micrometers and a height of 250 micrometers, then one kg of particles contains approximately 3,369,000 particles. Thus, a first plurality of molded particles with those characteristics that weighs 20 kg of includes approximately 33 billion individual particles Thus, when collected for commercial purposes, the number of particles in a first plurality of molded particles can be even larger than those discussed above, such as 500,000 or more, 750,000 or more, 1,000,000 or more, 2,500,000 or more, 5,000,000 or more, 10,000,000 or more, 50,000,000 or more, 100,000,000 or more, 250,000,000 or more, 500,000,000 or more, 750,000,000 or more, 1 billion or more, 2 billion or more, 3 billion or more, 5 billion or more, 10 billion or more, 15 billion or more, 25 billion or more, 50 billion or more, or 100 billion or more.

Typically, large numbers of particles, such as those discussed above, cannot reasonably be made with a reproducibly uniform shape by conventional milling processes. One reason for this is that milling processes often leave an artifact, such as a dimple or protrusion, on a milled product. The size and shape of such artifacts are often not well controlled. Another reason is that milling such large numbers of particles can have a prohibitively high cost, especially when compared to processes such as the molding processes discussed herein.

FIG. 1 shows an example of a plurality of molded particles used in a vacuum insulated glass unit. An insulated glass unit 10 includes a first sheet of glass 11 and a second sheet of glass 12. The first sheet of glass 11 and second sheet of glass 12 are separated by a plurality of molded particles 14. An edge seal 13 maintains a vacuum between the first and second sheets of glass, 11 and 12. As such, the plurality of molded particles 14 must maintain their structural integrity in this environment in order to maintain a separation between the first sheet of glass 11 and the second sheet of glass 12.

Figure 2:
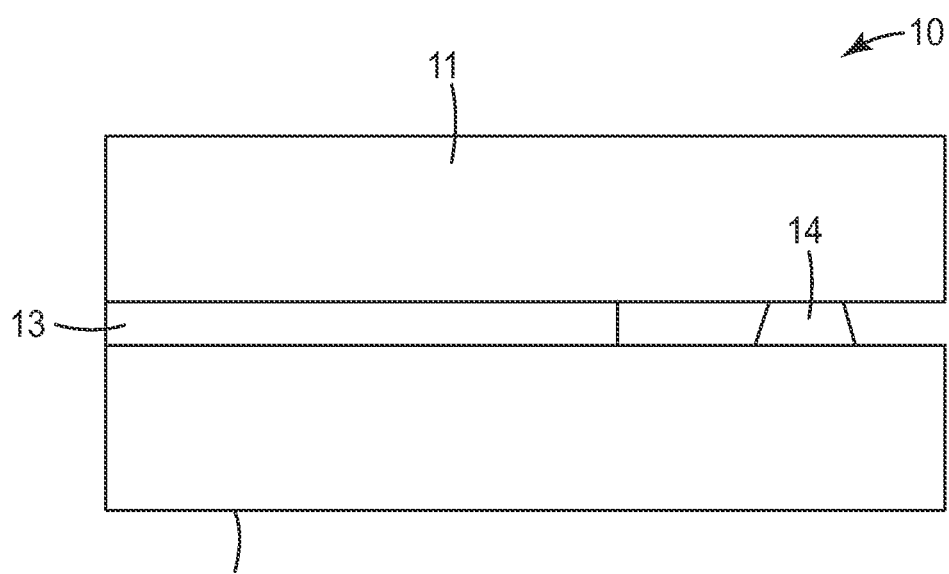
FIG. 2 is a side sectional view of a vacuum insulated glass unit.

In the vacuum insulated glass units illustrated in FIGS. 1 and 2, the plurality of molded particles function as spacers to maintain the separation of glass panes and can leave a vacuum gap within an insulated glass unit. In FIGS. 1 and 2, the glass panes are substantially co-extensive with one another to make a complete insulated glass unit.

When used in this manner, the plurality of molded particles are often shaped like a disk having a diameter (largest dimension) of 600 micrometers or less and a thickness of 100 micrometers to 600 micrometers. Alternatively, the plurality of molded particles can have a diameter (largest dimension) of less than 1000 micrometers, or 800 micrometers, or 600 micrometers, or 400 micrometers, or 200 micrometers, or 100 micrometers. The plurality of molded particles can be useful for this application because they can be stable to vacuum glazing fabrication conditions, including high temperature edge frit sealing at temperatures such as 400° C. The plurality of molded particles can also have sufficient physical integrity, such as photo-, mechanical, and thermal stability, which can make them suitable for use in this application because they can be able to withstand years of use in exterior window applications in a number of environments.

The first plurality of molded particles can, in some cases, have a compressive strength of greater than 400 MPa, 600 MPa, 800 MPa, 1,000 MPa, or 1,500 MPa. The plurality of molded particles can have a compressive strength that is less than 2,000 MPa, 1,500 MPa, or 1,000 MPa.

The first plurality of molded particles can have a thermal conductivity of 10 W m$^{-2\circ}$ K$^{-1}$ or less, 5 W m$^{-2\circ}$ K$^{-1}$ or less, or 3 W m$^{-2\circ}$ K$^{-1}$ or less. The thermal conductivity can be 1 W m$^{-2\circ}$ K$^{-1}$ or greater, 2 W m$^{-2\circ}$ K$^{-1}$ or greater, 3 W m$^{-2\circ}$ K$^{-1}$ or greater, 5 W m$^{-2\circ}$ K$^{-1}$ or greater, or 7 W m$^{-2\circ}$ K$^{-1}$ or greater. The strength and thermal conductivity described herein can facilitate the first plurality of molded particles maintaining separation between the two planes of glass without adversely affecting the vacuum insulation.

As discussed above, the shape of the first plurality of molded particles is determined by the shape of the cavities in the mold used in the fabrication process. A hexagonal or octagonal shape is often used, as illustrated in FIGS. 3A-3F. The plurality of molded particles can include surfaces between the sidewalls for placement against the glass panes of a vacuum insulated glass unit.

Figure 3A:
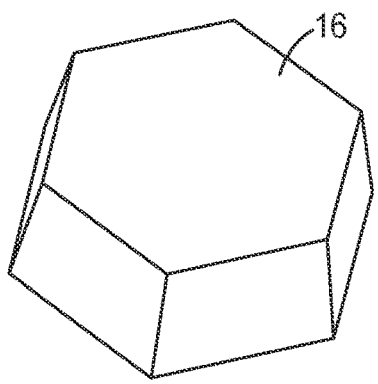
FIGS. 3A-3H are diagrams of exemplary molded particles.
Figure 3B:
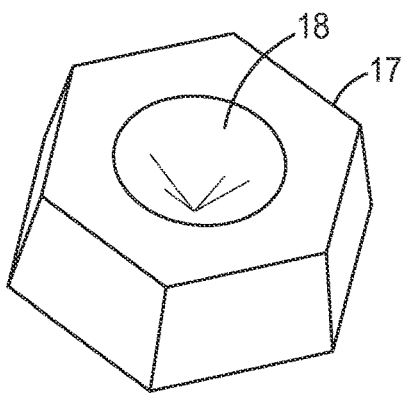
Figure 3C:
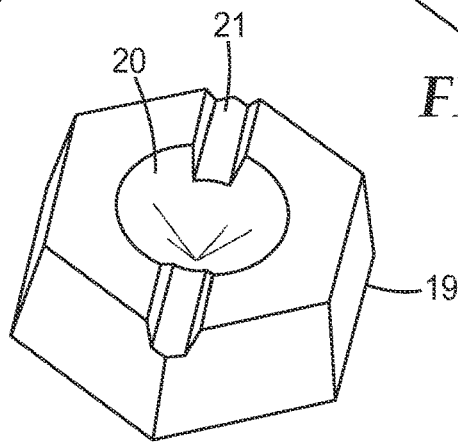
Figure 3D:
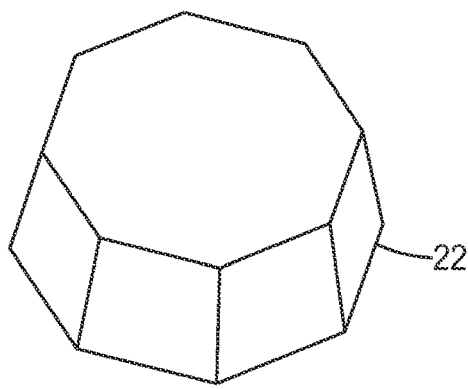
Figure 3E:
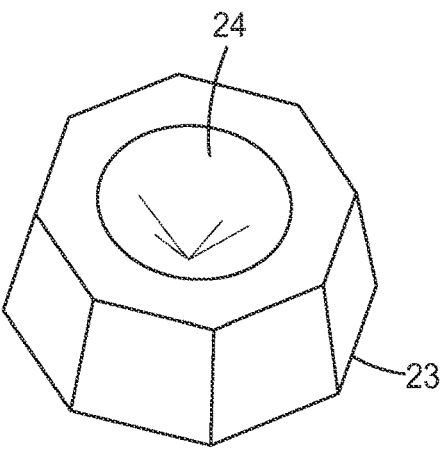
Figure 3F:
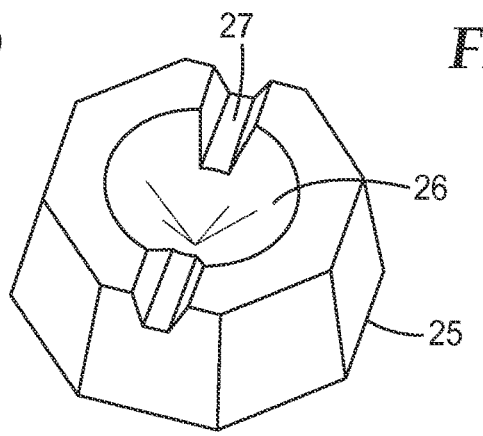
Figure 3G:
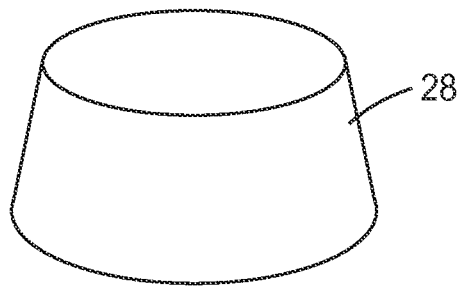
Figure 3H:
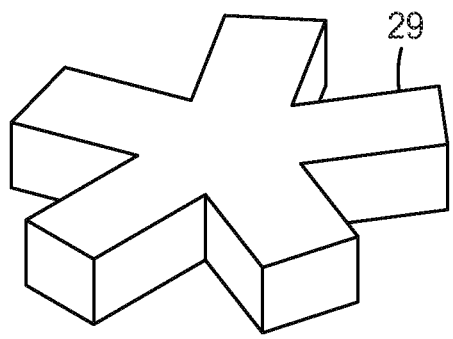

One exemplary shape for the first plurality of molded particles is illustrated by molded particle 16, which has a tapered hexagonal shape (FIG. 3A). Another exemplary shape is illustrated by molded particle 17, which has a tapered hexagonal shape with an indentation 18 (FIG. 3B). Yet another exemplary shape is illustrated by molded particle 19, which has a tapered hexagonal shape with an indentation 20 and a notch 21 (FIG. 3C). Still another exemplary shape is illustrated by molded particle 22, which has a tapered octagonal shape (FIG. 3D). An additional exemplary shape is illustrated by molded particle 23, which has a tapered octagonal shape with an indentation 24 (FIG. 3E). Another additional exemplary shape is illustrated by molded particle 25, which has a tapered octagonal shape with an indentation 26 and a notch 27 (FIG. 3F). Yet another additional exemplary shape is illustrated by molded particle 28, which has a tapered round disk shape (FIG. 3G). Still another exemplary shape is illustrated by molded particle 29, which has a tapered shape with shaped sidewalls (FIG. 3H). Other shapes are possible such as a 12-sided body and non-tapered shapes.

Figure 3I:
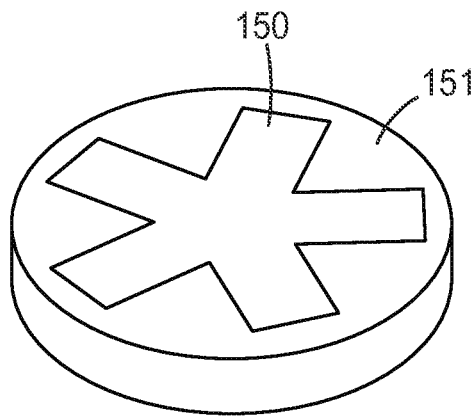
FIGS. 3I-K are diagrams of exemplary molded particles with functional coatings.
Figure 3J:
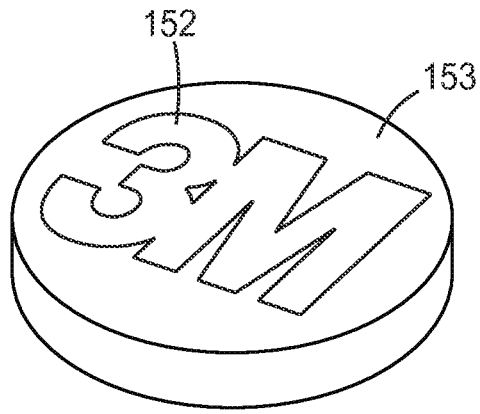
Figure 3K:
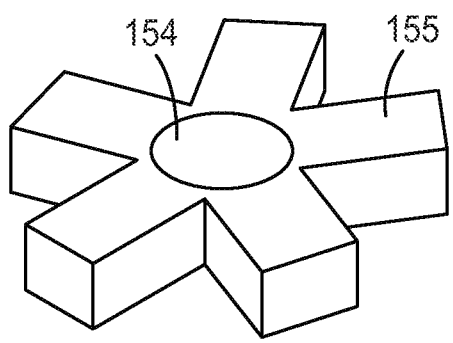

The plurality of molded particles can contain functional coatings, as illustrated by the exemplary pillars in FIGS. 3I-3K. A molded particle 151 includes a functional coating 150 (FIG. 3I). A molded particle 153 includes a functional coating 152 (FIG. 3J). A molded particle 155 includes a functional coating 154 (FIG. 3K).

Figure 3L:
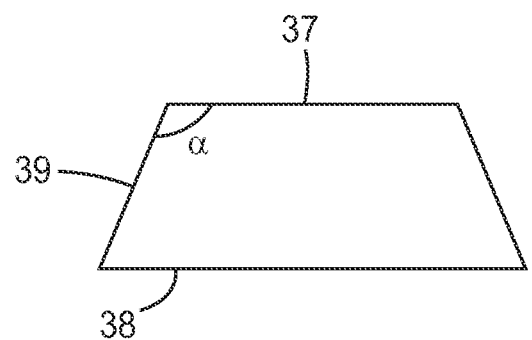
FIG. 3L is a diagram illustrating a draft angle in a molded particle.

FIGS. 3A-H show particle sidewalls that are tapered or sloped. Such shaping can improve mold release. For example, FIG. 3L shows a side view of a molded particle having a draft angle between a face 37, which has a smaller area than opposite surface 38, and a sloping sidewall 39. The angle of draft angle can be varied to change the relative sizes of each face 37 and 38. The draft angle is often from 95° to 130°, from 95° to 125°, from 95° to 120°, from 95° to 115°, from 95° to 110°, from, 95° to 105°, or from 95° to 100°.

Figure 4:
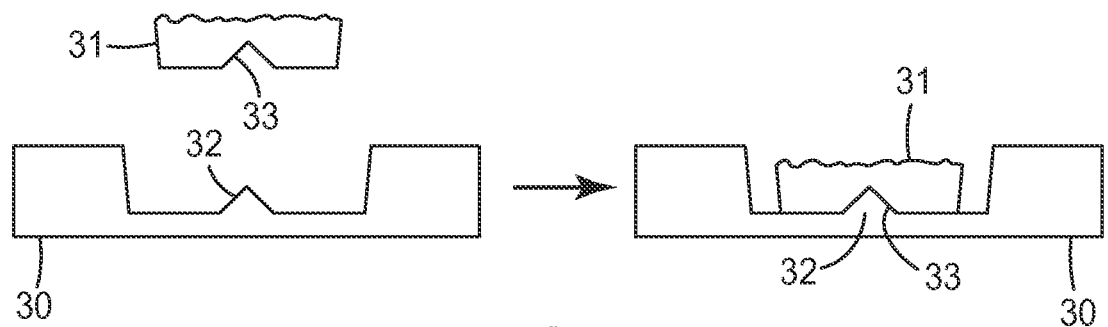
FIG. 4 is a diagram illustrating mechanical orientation of molded particle in a mold.

One or more of the plurality of molded particles can have one or more indentations, as illustrated in FIGS. 3B, 3C, 3E, and 3F. Such one or more indentations can facilitate mechanical differentiation of the two major surfaces during a coating, sorting, or positioning process. For example, FIG. 4 illustrates a crevice 30 in a mold having a protrusion 32 for mating with an indentation 33 on a molded particle 31. When a molded particle has one or more indentation, it can also have one or more notches in the outermost surface of the indented side, as illustrated in FIGS. 3C and 3F.

Figure 5A:
FIG. 5A is a side sectional view of molded particle shape.
Figure 5B:
FIG. 5B is a side sectional view of a molded particle with roughness.
Figure 5C:
FIG. 5C is a side sectional view of a molded particle with roughness and warp.

Typically, the plurality of molded particles will have a cross-sectional shape without any excessive roughness or warp. FIG. 5A illustrates a molded particle 34 having such a shape. In some cases, a small amount of warp or roughness can be acceptable. FIG. 5B illustrates a molded particle 35 having roughness, and FIG. 5C illustrates a molded particle 36 having roughness and warp. The methods disclosed herein can be used to produce compositions comprising a plurality of particles having no excessive roughness or warp, as illustrated in FIG. 5A.

The plurality of molded particles can have one or more coatings. Such one or more coatings can facilitate formation of a vacuum insulated glass unit, improve the efficiency of a vacuum insulated glass unit, or both. Such one or more coatings can find use when the first plurality of molded particles are used in applications or articles other than vacuum insulated glass units.

A planarization layer is one example of a coating on the plurality of molded particles. Planarization layers can comprise a thermally stable crosslinked composite, which can flatten and smooth one or more surfaces of the plurality of molded particles. Even when the plurality of molded particles have surfaces that are flat and smooth, a planarization layer can be used to provide a compressible layer for fabrication of a vacuum insulated glass to reduce the likelihood of cracking the glass panes in the vacuum insulated glass unit. The planarization layer can comprise an organic, inorganic, or hybrid polymeric binder and, in some cases, an inorganic nanoparticle filler.

A polymeric binder layer is another example of a coating on the plurality of molded particles. A polymeric binder layer can include one or more thermally stable organic polymers. Such polymers can be dimensionally stable upon exposures to temperatures up to 350° C. In many cases, the polymeric binder has a low thermal conductivity to reduce the transfer of heat from the exterior of the vacuum insulated glass unit to the interior of the vacuum insulated glass unit. Suitable polymers can include one or more of polyimide, polyamide, polyphenylene, polyphenylene oxide, polyaramide (e.g., products sold under the trade designation KEVLAR), polysulfone, polysulfide, polybenzimidazoles, and polycarbonate. One exemplary polymer that may be used is a polyetherimide manufactured by SABIC Innovative Plastics and sold under the trade designation ULTEM. Another exemplary material is an imide-extended bismaleimide, such as the one available from Designer Molecules (San Diego, Calif.) under the trade designation BMI-1700, which can be melt-processed at low temperatures and then cured to form a crosslinked polyimide network.

The polymeric binder layer can, in some cases, include thermally stable polymers. Such polymers can be dimensionally stable upon exposures to temperatures up to 350° C. Examples of such polymers include amorphous organopolysiloxane networks, which are chemical bond networks derived from condensation of organosiloxane precursors, as well as silsesquioxanes or polysilsesquioxanes, which are derived from fundamental molecular units that have silicon coordinated with three bridging oxygen atoms. Exemplary polysilsesquioxanes include one or more of polymethylsilsesquioxane, polyoctylsilsesquioxane, polyphenylsilsesquioxane and polyvinylsilsesquioxane. In some cases, the polysilsesquioxanes can be, acrylopoly oligomeric silsesquioxane (Hybrid Plastics of Hattiesburg, Miss.), polymethylsilsesquioxane available from Techneglas of Columbus, Ohio under the trade designation GR653L, GR654L, and GR650F, polyphenylsilsesquioxane available from Techneglas of Columbus, Ohio under the trade designation GR950F, and polymethylphenylsilsesquioxane available from Techneglas of Columbus, Ohio under the trade designation GR9O8F.

The polymeric binder layer can also comprise other alkoxysilanes, such as tetraalkoxysilanes and alkyltrialkoxysilanes having the formula: $(R')_x Si—(OR^2)_y$, wherein R' can be one or more of alkyl, alkylaryl, arylalkyl, aryl, hydroxyl, polyglycyl, or a polyether radical, $R^2$ can be one or more of alkyl, acetoxy, or methoxyethoxy, x is from 0 to 3 and y is from 1 to 4, with the proviso the sum of x and y is 4. One or more alkoxysilanes including mono, di, tri, and tetraalkoxysilanes may be added to control the crosslink density of the organosiloxane network, thereby affecting the physical properties of the organosiloxane network. Physical properties affected by crosslinking density include flexibility and adhesion promotion. Examples of such alkoxysilanes include one or more of tetraethoxysilane, tetramethoxysilane, methyltriethoxysilane, and methyltrimethoxysilane. Such ingredients may be present in an amount of about 0 to 50 weight percent based on the weight of the polymeric binder layer.

An adhesive layer is still another example of a coating that can be applied to a plurality of molded particles. An adhesive layer can comprise a thermal or radiation sensitive silsesquioxane, a photoinitiator, and a nanoparticle filler. This filler can be crosslinked photochemically and then heated to initiate condensation of the silanol groups of the silsesquioxane, forming a durable, thermally stable material.

The adhesive layer can provide adhesion between the plurality of molded particles and the glass panes.

An orientation layer is yet another example of a coating that can be applied to a plurality of molded particles. An orientation layer can be applied to the plurality of particles while they are in the one or more molds. The orientation layer can be applied on the mold side or the air side. The orientation layer can physically or chemically differentiate the mold and air sides of the plurality of molded particles. The orientation layer can be any layer that is one or more of electrically conductive, statically dissipative, ferromagnetic, ionic, hydrophobic, or hydrophilic.

A frit glass coating is still another example of a coating that can be applied to a plurality of molded particles. A frit glass coating can be dispersion of low melting glass microparticles in a sacrificial binder. It can be applied uniformly to the exterior of the plurality of molded particles. When the vacuum insulated glass unit is assembled, the sacrificial binder can thermally decompose and the frit glass can flow to form an adhesive bond between one or more of the molded particles in the plurality of molded particles and one or both of the glass panes. Exemplary sacrificial polymers include one or more of nitrocellulose, ethyl cellulose, alkylene polycarbonates, (meth)acrylates, and polynorbonenes. The sacrificial polymers can be also act as binders for the frit glass in the frit glass coating.

A low coefficient of friction (COF) layer is yet another example of a coating that can be applied to a plurality of molded particles. A low COF layer can be a thermally stable layer that promotes slip between one or more surfaces of the plurality of molded particles and one of the inner glass surfaces in a vacuum insulated glass unit. The low COF layer can comprise a monolayer of fluorosilanes, a fluorinated nanoparticle filled polyimide, such as those sold under the trade designation Corin XLS, from NeXolve, Huntsville, Ala., a thin coating of a low surface energy polymer, such as polyvinylidine fluoride or polytetrafluoroethylene, diamond-like carbon (DLC), a lamellar layer comprising graphite, or other thermally stable lubricant materials.

The properties that allow the compositions described herein to be suitable for use in applications such as vacuum insulated glass units are surprising. Particularly surprising is that metal oxide molded particles having a largest dimension that is no greater than 1 cm can also be free of cracks with a maximum dimension of 10 micrometers or greater. This is so because metal oxide compositions with similar chemical content as the molded particles, such as those described in WO 2013/055432 (Kolb) cannot be molded into small sizes, such as 1 cm or less, but instead are tooled to achieve their final size and shape. Further, molding processes that are known to produce metal oxide particles with sizes less than 1 cm, such as those disclosed in U.S. Pat. No. 8,123,828 (Culler), produce molded particles with significant amounts of fractures (i.e., cracks).

EXEMPLARY EMBODIMENTS

Exemplary embodiments of the present disclosure may take on various modifications and alterations without departing from the scope and spirit of the present disclosure. Accordingly, it should be understood that the particular embodiments described below are not intended to be limiting Embodiment 1

A composition comprising at least a first plurality of molded particles, each molded particle of the first plurality of molded particles comprising at least 70 mol percent $ZrO_2$, wherein the first plurality of molded particles are uniform in shape;
each of the molded particles of the first plurality of molded particles has a largest dimension of no more than 1 cm; and 80 percent or more of the molded particles of the first plurality of molded particles are free of cracks having a maximum dimension greater than 10 micrometers.

Embodiment 2

The composition of embodiment 1, wherein each of the first plurality of molded particles has a largest dimension that is no more than 5 mm.

Embodiment 3

The composition of any preceding embodiment, wherein the variation in molded particle volume among the first plurality of molded particles is no more than 10%.

Embodiment 4

The composition of embodiment 3, wherein the variation in molded particle volume among the first plurality of molded particles is no more than 5%.

Embodiment 5

The composition of embodiment 4, wherein the variation in molded particle volume among the first plurality of molded particles is no more than 2%.

Embodiment 6

The composition of any of the preceding embodiments, wherein the first plurality of molded particles have one or more smallest dimensions, and wherein a variation in size of the one or more smallest dimensions is no more than 10%

Embodiment 7

The composition of embodiment 6, wherein the first plurality of molded particles have one or more smallest dimensions, and wherein the variation in size of the one or more smallest dimensions is no more than 5%.

Embodiment 8

The composition of embodiment 7, wherein the first plurality of molded particles have one or more smallest dimensions, and wherein the variation in size of the one or more smallest dimensions is no more than 2%.

Embodiment 9

The composition of any of the preceding embodiments, wherein the first plurality of molded particles have one or more largest dimensions, and wherein a variation in size of the one or more largest dimensions is no more than 10%.

Embodiment 10

The composition of embodiment 9, wherein the first plurality of molded particles have one or more largest dimensions, and wherein the variation in size of the one or more largest dimensions is no more than 5%.

Embodiment 11

The composition of embodiment 10, wherein the first plurality of molded particles have one or more largest dimensions, and wherein the variation in size of the one or more largest dimensions is no more than 2%.

Embodiment 12

The composition of any preceding embodiment, wherein at least 85% of the first plurality of molded particles are free of cracks having a maximum dimension greater than 10 micrometers.

Embodiment 13

The composition of embodiment 12, wherein at least 90% of the first plurality of molded particles are free of cracks having a maximum dimension greater than 10 micrometers.

Embodiment 14

The composition of embodiment 13, wherein at least 95% of the first plurality of molded particles are free of cracks having a maximum dimension greater than 10 micrometers.

Embodiment 15

The composition of any of the preceding embodiments, wherein at least 99% of the first plurality of molded particles are free of cracks having a maximum dimension greater than 10 micrometers.

Embodiment 16

The composition any of the preceding embodiments, wherein the cracks having a maximum dimension no greater than 10 micrometers have a maximum dimension no greater than 7 micrometers.

Embodiment 17

The composition of embodiment 16, wherein the wherein the cracks having a maximum dimension no greater than 10 micrometers have a maximum dimension no greater than 5 micrometers.

Embodiment 18

The composition of embodiment 17, wherein the wherein the cracks having a maximum dimension no greater than 10 micrometers have a maximum dimension no greater than 2 micrometers.

Embodiment 19

The composition of any preceding embodiment, further comprising a second plurality of molded particles, the second plurality of molded particles having at least one of a different volume, a different shape, a different chemical composition, a different longest dimension, and a different shortest dimension from the first plurality of molded particles.

Embodiment 20

The composition of embodiment 19, wherein the second plurality of molded particles have a different shape from the first plurality of molded particles.

Embodiment 21

The composition of any preceding embodiment, wherein each particle of the first plurality of molded particles further comprises from 1 mol percent to 30 mol percent of one or more rare earth oxides.

Embodiment 22

The composition of any preceding embodiment, wherein each particle of the first plurality of molded particles further comprises 1 mol percent or more of one or more rare earth oxides.

Embodiment 23

The composition of embodiment 22, wherein each particle of the plurality of molded particles further comprises 5 mol percent or more of one or more rare earth oxides.

Embodiment 24

The composition of embodiment 23, wherein each particle of the first plurality of molded particles further comprises 10 mol percent or more of one or more rare earth oxides.

Embodiment 25

The composition of embodiment 24, wherein each particle of the first plurality of molded particles further comprises 15 mol percent or more of one or more rare earth oxides.

Embodiment 26

The composition of embodiment 25, wherein each particle of the first plurality of molded particles further comprises 20 mol percent or more of one or more rare earth oxides.

Embodiment 27

The composition of embodiment 26, wherein each particle of the first plurality of molded particles further comprises 25 mol percent or more of one or more rare earth oxides.

Embodiment 28

The composition of any of the preceding embodiments, wherein each first particle of the plurality of molded particles further comprises no more than 30 mol percent of one or more rare earth oxides.

Embodiment 29

The composition embodiment 28, wherein each particle of the first plurality of molded particles further comprises no more than 25 mol percent of one or more rare earth oxides.

Embodiment 30

The composition embodiment 29, wherein each particle of the first plurality of molded particles further comprises no more than 20 mol percent of one or more rare earth oxides.

Embodiment 31

The composition embodiment 30, wherein each particle of the first plurality of molded particles further comprises no more than 15 mol percent of one or more rare earth oxides.

Embodiment 32

The composition embodiment 31, wherein each particle of the first plurality of molded particles further comprises no more than 10 mol percent of one or more rare earth oxides.

Embodiment 33

The composition embodiment 32, wherein each particle of the first plurality of molded particles further comprises no more than 5 mol percent of one or more rare earth oxides.

Embodiment 34

The composition of any of embodiments 32-33, wherein each particle of the first plurality of molded particles further comprises from 1 mol percent to 30 mol percent of one or more rare earth oxides.

Embodiment 35

The composition of any of claims 21-34, wherein the rare earth oxides comprise $Y_2O_3$.

Embodiment 36

The composition of any of claims 21-34, wherein the rare earth oxides comprise $La_2O_3$.

Embodiment 37

The composition of any of the preceding embodiments, wherein each particle of the first plurality of molded particles further comprise from 1 mol percent to 15 mol percent $Y_2O_3$.

Embodiment 38

The composition of any of the preceding embodiments, wherein each particle of the first plurality of molded particles further comprise from 1 mol percent to 5 mol percent $La_2O_3$.

Embodiment 39

The composition of any of the preceding embodiments, wherein each particle of the first plurality of molded particles further comprise from 0.01 mol percent to 0.5 mol percent $Al_2O_3$.

Embodiment 40

The composition of any of the preceding embodiments, wherein each particle of the plurality of molded particles comprises at least 0.01 mol percent $Al_2O_3$.

Embodiment 41

The composition of embodiment 40, wherein each particle of the first plurality of molded particles comprises at least 0.05 mol percent $Al_2O_3$.

Embodiment 42

The composition of embodiment 41, wherein each particle of the first plurality of molded particles comprises at least 0.1 mol percent $Al_2O_3$.

Embodiment 43

The composition of embodiment 42, wherein each particle of the first plurality of molded particles comprises at least 0.25 mol percent $Al_2O_3$.

Embodiment 44

The composition of any of the preceding embodiments, wherein each particle of the first plurality of molded particles comprises no more than 0.5 mol percent $Al_2O_3$.

Embodiment 45

The composition of embodiment 44, wherein each particle of the first plurality of molded particles comprises no more than 0.25 mol percent $Al_2O_3$.

Embodiment 46

The composition of embodiment 45, wherein each particle of the first plurality of molded particles comprises no more than 0.5 mol percent $Al_2O_3$.

Embodiment 47

An article comprising the composition of any of the preceding embodiments.

Embodiment 48

The article of embodiment 47, further comprising glass.

Embodiment 49

The article of embodiment 48, wherein the article is vacuum insulated glass.

Embodiment 50

A method of making the composition or article of any of the preceding claims, comprising adding one or more radically polymerizable surface modifiers to a sol, the sol comprising crystalline metal oxide particles having an average primary particle size no greater than 50 nanometers, wherein at least 70 mol percent of the crystalline metal oxide in the composition is $ZrO_2$;

placing the sol into one or more molds;

polymerizing the one or more radically polymerizable surface modifiers to convert the sol to a cured intermediate;

heating the cured intermediate at one or more temperatures for one or more periods of time to calcine and sinter the cured intermediate and form a plurality of molded particles.

Embodiment 51

The method of embodiment 50, further comprising concentrating the sol.

Embodiment 52

The method of any of embodiments 50-51, further comprising
alcohol exchange of water from the cured intermediate; and
supercritically extracting alcohol from the cured intermediate.

Embodiment 53

The method of any of embodiments 50-52, wherein the step of adding one or more radically reactive surface modifiers to the sol further comprises adding one or more radical initiators to the sol.

Embodiment 54

The method of any of embodiments 50-53, further comprising adding at least one of one or more radically polymerizable monomers and one or more radically polymerizable oligomers to the sol.

Embodiment 55

The method of any of embodiments 50-54, wherein the step of polymerizing the one or more radically polymerizable surface modifiers to convert the composition to a cured intermediate comprises initiating polymerization of the radically polymerizable surface modifiers by exposing the radically polymerizable surface modifiers to ultra-violet radiation.

Embodiment 56

The method of any of embodiments 50-55, wherein the step of polymerizing the one or more radically polymerizable surface modifiers to convert the composition to a cured intermediate comprises initiating polymerization of the radically polymerizable surface modifiers by exposing the radically polymerizable surface modifiers to heat.

Embodiment 57

The method of any of embodiments 50-56, wherein each of the one or more molds comprise a first plurality of first uniformly shaped cavities, the first uniformly shaped cavities comprising polymeric surfaces.

Embodiment 58

The method of any of embodiments 50-57, wherein each of the one or more molds comprise a first plurality of first uniformly shaped cavities, the first uniformly shaped cavities comprising metal surfaces.

Embodiment 59

The method of any of embodiments 50-58, wherein each of the one or more molds comprise a first plurality of first uniformly shaped cavities, the first uniformly shaped cavities comprising ceramic surfaces.

Embodiment 60

The method of any of embodiments 50-59, wherein each of the one or more molds comprise a first plurality of first uniformly shaped cavities, the first uniformly shaped cavities comprising glass surfaces.

Embodiment 61

The method of any of embodiments 50-60, wherein each of the one or more molds further comprises a second plurality of second uniformly shaped cavities, wherein the second uniformly shaped cavities have at least one of a size, shape, or volume, that is different from that of the first uniformly shaped cavities.

Embodiment 62

The method of embodiment 61, wherein the polymeric surfaces comprise polypropylene.

Embodiment 63

The method of any of embodiments 50-62, wherein no release agent is applied to the plurality of cavities.

Embodiment 64

The method of any of embodiments 50-63, wherein a release agent is applied to the plurality of cavities.

Embodiment 65

The method of embodiment 50-64, wherein the release agent is an oil.

Embodiment 66

The method of any of embodiments 50-65, wherein the plurality of cavities has the shape of a disk, cone, cylinder, or polyhedron.

Embodiment 67

The method of embodiment 50-66, wherein the polyhedron is pyramidal.

EXAMPLES

Throughout the Examples, the relative amount of inorganic materials is reported as mol percent of the total mols of metal oxide, except where otherwise noticed.

The following terms are used throughout the Examples:
HEMA is an abbreviation for (hydroxyethyl)methacrylate
HEAA is an abbreviation for N-hydroxyethyl acrylamide
IRGACURE 819 is a trade designation for bis(2,4,6-trimethylbenxoyl)-phenylphosphineoxide.

Example 1

Hydrothermal Reaction

A hydrothermal reactor was prepared from 50 feet (15 meters) of Stainless Steel Braided Smooth Tube Hose (DuPont T62 Chemfluor PTFE, 0.25 inch inner diameter, 0.065 inch thick wall tubing available from Saint-Gobain Performance Plastics, Beaverton, Mich.). This tube was immersed in a bath of peanut oil heated to 225° C. A coil of an additional 10 feet (3 meters) of Stainless Steel Braided Smooth Tube Hose (DuPont T62 Chemfluor PTFE, 0.25 inch inner diameter, 0.065 inch thick wall was attached to the tube, and 10 feet (3 meters) of 0.25 inch stainless-steel tubing with a diameter of 0.25 inch (0.64 cm) and wall thickness of 0.035 inch (0.089 cm) was attached to the coil. The stainless steel tubing was immersed in an ice-water bath to cool the material and a backpressure regulator valve was used to maintain an exit pressure of 400 psi (pounds per square inch).

Sol Preparation

A precursor solution was prepared by combining the zirconium acetate solution (2,000 g) with DI water (1680 g). Yttrium acetate (126.46 g) and lanthanum acetate (18.62 g) were added and mixed until fully dissolved. The solids content of the resulting solution was measured gravimetrically (120° C./1 hr forced air oven) to be 21.6 wt %. Deionized water (517 g) was added to adjust the final concentration to 19 wt %. This procedure was repeated four times to give a total of approximately 17,368 g of precursor material. The resulting solution was pumped at a rate of 11.48 mL/min through the hydrothermal reactor at 225° C. The average residence time was 42 min. A clear and stable zirconia sol was obtained. The resulting sol had a $ZrO_2/Y_2O_3/La_2O_3$ molar ratio of 93.5/5.0/1.5.

Diafiltration and Concentration

The as prepared sol was concentrated to 20-35 wt % solids by ultrafiltration using a membrane cartridge (M21S-100-01P available from SpectrumLabs; 18617 Broadwick St. Rancho Dominguez, Calif. 90220). The final composition was adjusted by one or more of diafiltration, ultrafiltration, and distillation. The final composition of the sol was 49.184% solids, 2.36 mmole acetic acid/g $ZrO_2$, with an ethanol:water weight ratio of 68:32.

Addition of Polymerizable Materials

The above sol (61.52 g) was charged to a large jar. Acrylic acid (2.88 g) and HEMA (1.47 g) were charged to the sol with stirring. IRGACURE 819 (0.0337 g) was dissolved in ethanol (1.55 g) and charged to the sol with stirring. The sol was then passed through a 1 micrometer filter.

Sol Casting

The sol (93.5 mol % $ZrO_2$/5 mol % $Y_2O_3$/1.5 mol % $La_2O_3$, 0.05 wt % IRGACURE 819, HEMA) was cast into a polypropylene triangle sheet mold (made by 3M using methods described herein) using a pipette. The mold had arrays of equilateral triangles with 5 mm long sides and a cavity depth of 2 mm. A glass plate coated with a thin layer of Stoner Mold Release was laid on to the sol filled mold and clamped in place. The sol was cured for 2 min using a 460 nm LED light bank. After curing, the triangles released from the mold but stuck to the glass plate. A thin glass cover slide was pushed between the triangle gel pieces and the glass to remove the triangular shaped pieces. These pieces were placed in an aluminum pan and allowed to dry in open air at ambient temperature.

Removal of Organics

The dried triangular shaped pieces were placed on a bed of zirconia beads in an alumina crucible, covered with alumina fiberboard, and heated in air according to the following schedule:
1—Heat from 20° C. to 220° C. at 18° C./hr rate,
2—Heat from 220° C. to 244° C. at 1° C./hr rate,
3—Heat from 244° C. to 400° C. at 6° C./hr rate,
4—Heat from 400° C. to 1090° C. at 60° C./hr rate,
5—Cool from 1090° C. to 20° C. at 120° C./hr rate, Sintering The calcined triangular shaped pieces were placed on a bed of zirconia beads in an alumina crucible, covered with alumina fiberboard, and heated in air according to the following schedule to form molded particles:
1—Heat from 20° C. to 1020° C. at 600° C./hr rate,
2—Heat from 1020° C. to 1267° C. at 120° C./hr rate,
3—Hold at 1267° C. for 2 hr.
3—Cool down from 1267° C. to 20° C. at 600° C./hr rate.

Confocal microscope surface analysis of the sintered plurality of molded particles showed the tool side surface of this pillar had a roughness Ra of about 1.1 µm, and an air side roughness Ra<1 µm. The plurality of molded particles appeared visually translucent. The molded particles had a maximum variation in height of 2 µm. The top and bottom surfaces were essentially parallel.

The compression strength of the plurality of molded particles was measured using an Instron Model 5500R and ASTM standard C1424-10: Monotonic Compressive Strength of Advanced Ceramics at Ambient Temperature. The average maximum load was 2,290 N, the average area was 1.540 $mm^2$, and the average compression strength was $1.49 \times 10^9$ Pa.

Example 2

Hydrothermal Reaction, Sol Preparation, Diafiltration and Concentration

A precursor solution was prepared and processed by a method similar to that described in Example 1, except that the ratio of $ZrO_2$ to $Y_2O_3$ was 95.76 to 4.24. The resulting sol was 49.45% solids, 2.27 mmole acetic acid/g $ZrO_2$ and the ethanol:water weight ratio was 60:40.

Addition of Polymerizable Materials

The above sol (367.02 g) was charged to a flask. Acrylic acid (17.28 g) and HEAA (8.86 g) were charged to the sol and stirred. IRGACURE 819 (0.3062 g) was dissolved in ethanol (15.12 g) and charged to the sol with stirring.

Sol Casting

The sol (95.76 mol % $ZrO_2$/4.24 mol % $Y_2O_3$, 0.075 wt % IRGACURE 819, HEAA, acrylic acid) was cast into a polypropylene hexagonal sheet mold. The mold contained hexagonal structures with dimensions of about 1,000 micrometers across by 360 micrometers deep. The sample was prepared in a clean room. The tool was adhered to a 4"×6" (10.16×15 cm) glass plate with double sided tape. The sol was flood coated onto the tool using a pipette. A polyethyleneterephthalate (PET) film was then carefully placed over the filled tool to prevent significant void formation. A 4"×6" (10.16×15 cm) glass plate was placed on top of the PET and pressure was applied by hand to remove excess sol. The construction was then clamped together. The sol was cured for 2 min using a 420 nm (15 watt) light source. The cured hexagons were removed from the mold and dropped onto a screen to dry.

Removal of Organic Materials

The dried hexagons were placed in an alumina crucible, covered with an alumina crucible cover, and heated in air according to the following schedule:
1—Heat from 20° C. to 220° C. at 18° C./hr rate,
2—Heat from 220° C. to 244° C. at 1° C./hr rate,
3—Heat from 244° C. to 400° C. at 6° C./hr rate,
4—Heat from 400° C. to 1020° C. at 60° C./hr rate,
5—Cool from 1020° C. to 20° C. at 120° C./hr rate, The calcined hexagons were then sintered as follows:

Sintering

The hexagons were placed in an alumina crucible, covered with alumina fiberboard, and heated in air according to the following schedule:

1—Heat from 20° C. to 1020° C. at 600° C./hr rate,
2—Heat from 1020° C. to 1287° C. at 120° C./hr rate,
3—Hold at 1287° C. for 2 hr.
3—Cool down from 1287° C. to 20° C. at 600° C./hr rate.

An SEM micrograph of one of the hexagonally shaped molded particles produced in this Example appears in FIG. 6.

What is claimed is:

1. A composition comprising at least a first plurality of molded particles, each molded particle of the first plurality of molded particles consisting of 70 to 100 mol percent $ZrO_2$ and 0 to 30 mol percent of one of more optional metal oxides selected from the group consisting of $Y_2O_3$, $La_2O_3$, $Al_2O_3$, $CeO_2$ in an amount of 0 to 20,000 ppm, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Fe_2O_3$, $MnO_2$, $Co_2O_3$, $Cr_2O_3$, NiO, CuO, $Bi_2O_3$, $Ga_2O_3$, $V_2O_5$, and $W_2O_5$,
    wherein
    the first plurality of molded particles are sintered, non-spherical, and uniform in shape;
    each of the molded particles of the first plurality of molded particles has a largest dimension of no more than 1 cm;
    variation in volume of 100 percent of the first molded particles in the composition is no more than 5 percent; and
    80 percent or more of the molded particles of the first plurality of molded particles are free of cracks having a maximum dimension greater than 10 micrometers.

2. The composition of claim 1, further comprising a second plurality of particles, the second plurality of particles being sintered and having at least one of a different volume, a different shape, a different chemical composition, a different longest dimension, and a different shortest dimension from that of the first plurality of molded particles.

3. The composition of claim 2, further comprising a third plurality of particles, the third plurality of particles being sintered and having at least one of a different volume, a different shape, a different chemical composition, a different longest dimension, and a different shortest dimension from that of the second plurality of molded particles.

4. The composition of claim 1, wherein 90 percent or more of the molded particles of the first plurality of molded particles are free of cracks having a maximum dimension greater than 10 micrometers.

5. The composition of claim 1, wherein the cracks have a maximum dimension no greater than 7 micrometers.

6. The composition of claim 1, wherein each particle of the first plurality of molded particles comprises from 1 mol percent to 30 mol percent of one or more rare earth oxides.

7. The composition of claim 1, wherein each particle of the first plurality of molded particles comprise from 1 mol percent to 15 mol percent $Y_2O_3$.

8. The composition of claim 1, wherein each particle of the first plurality of molded particles comprise from 1 mol percent to 5 mol percent $La_2O_3$.

9. The composition of claim 1, wherein each particle of the first plurality of molded particles comprise from 0.01 mol percent to 0.5 mol percent $Al_2O_3$.

10. The composition of claim 1, wherein the first plurality of molded particles have the shape of a disk, a cone, a cylinder, or a polyhedron.

11. The composition of claim 1, wherein the first plurality of molded particles have a pyramidal shape.

12. The composition of claim 1, wherein the first plurality of molded particles comprises 1,000 particles or more.

13. An article comprising the composition of claim 1.

14. The article of claim 13, wherein the article comprises glass.

15. The article of claim 14, wherein the article is a vacuum insulated glass unit.

16. The composition of claim 1, variation in volume of the first plurality of molded particles is no more than 2 percent.

17. The article of claim 1, wherein the first plurality of molded particles is free of a coloring agent selected from $CeO_2$.

* * * * *